(12) United States Patent
Matohara et al.

(10) Patent No.: US 11,898,508 B2
(45) Date of Patent: Feb. 13, 2024

(54) INTERNAL COMBUSTION ENGINE CONTROL DEVICE

(71) Applicant: Hitachi Astemo, Ltd., Hitachinaka (JP)

(72) Inventors: Shinya Matohara, Hitachinaka (JP); Yoshihiko Akagi, Hitachinaka (JP); Kazuhiro Oryoji, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 179 days.

(21) Appl. No.: 17/596,433

(22) PCT Filed: Jun. 23, 2020

(86) PCT No.: PCT/JP2020/024510
§ 371 (c)(1),
(2) Date: Dec. 10, 2021

(87) PCT Pub. No.: WO2021/002240
PCT Pub. Date: Jan. 7, 2021

(65) Prior Publication Data
US 2022/0235719 A1 Jul. 28, 2022

(30) Foreign Application Priority Data
Jul. 3, 2019 (JP) ................................ 2019-124206

(51) Int. Cl.
*F02D 41/00* (2006.01)
*F02B 29/04* (2006.01)
*F02M 26/22* (2016.01)

(52) U.S. Cl.
CPC ...... *F02D 41/0047* (2013.01); *F02B 29/0425* (2013.01); *F02M 26/22* (2016.02);
(Continued)

(58) Field of Classification Search
CPC ...... F02B 29/04; F02B 29/0425; F02D 35/02; F02D 41/005; F02D 41/18; F02D 41/047;
(Continued)

(56) References Cited

U.S. PATENT DOCUMENTS 6,367,256 B1 * 4/2002 McKee ................... F02M 26/47
60/605.2
9,145,823 B2 * 9/2015 Glugla ................ F02D 41/0007
(Continued)

FOREIGN PATENT DOCUMENTS

JP 2001-280202 A 10/2001
JP 2018-188991 A 11/2018

OTHER PUBLICATIONS

Japanese-language Office Action issued in Japanese Application No. 2021-529973 dated Oct. 25, 2022 with English translation (12 pages).
(Continued)

*Primary Examiner* — Phutthiwat Wongwian
*Assistant Examiner* — Arnold Castro
(74) *Attorney, Agent, or Firm* — Crowell & Moring LLP

(57) ABSTRACT

Provided is an internal combustion engine control device capable of appropriately correcting a flow rate of EGR gas. Therefore, an internal combustion engine control device 20 includes moisture amount calculation units 301 and 302, a dew condensation calculation unit 303, and an EGR correction unit 304. The moisture amount calculation unit 301 calculates a total moisture amount contained in the mixed gas. The dew condensation calculation unit 303 calculates a dew condensation generation amount WQcon in an intercooler based on the total moisture amount. The EGR correction unit 304 corrects a flow rate of the EGR gas based on the dew condensation generation amount WQcon.

12 Claims, 23 Drawing Sheets

(52) U.S. Cl.
CPC .. *F02D 2200/023* (2013.01); *F02D 2200/024* (2013.01); *F02D 2200/0414* (2013.01); *F02D 2200/0418* (2013.01); *F02D 2200/0602* (2013.01); *F02D 2200/70* (2013.01)

(58) Field of Classification Search
CPC ............. F02D 41/0047; F02D 41/0055; F02D 41/0065; F02D 41/0072; F02D 41/0085; F02D 41/1486; F02D 2200/021; F02D 2200/023; F02D 2200/024; F02D 2200/70; F02D 2200/0406; F02D 2200/0414; F02D 2200/0418; F02D 2200/0602; F02D 2041/0067; F02M 26/06; F02M 26/07; F02M 26/22; F02M 26/47; Y02T 10/12; Y02T 10/40
USPC ........................................ 123/179.25, 568.12
See application file for complete search history.

(56) References Cited

U.S. PATENT DOCUMENTS

| | | | | |
|---|---|---|---|---|
| 9,845,772 | B2* | 12/2017 | LaPointe | F02B 29/0443 |
| 10,138,800 | B2* | 11/2018 | LaPointe | F02M 26/28 |
| 10,619,587 | B2* | 4/2020 | Haga | F02D 41/0055 |
| 10,808,656 | B2* | 10/2020 | Oh | F02D 41/3005 |
| 2015/0369179 | A1* | 12/2015 | Hotta | F02M 26/24 60/599 |
| 2018/0313286 | A1 | 11/2018 | Haga et al. | |

OTHER PUBLICATIONS

International Search Report (PCT/ISA/210) issued in PCT Application No. PCT/JP2020/024510 dated Sep. 24, 2020 with English translation (four (4) pages).
Japanese-language Written Opinion (PCT/ISA/237) issued in PCT Application No. PCT/JP2020/024510 dated Sep. 24, 2020 (three (3) pages).

* cited by examiner

EGR GAS CORRECTION TABLE

| FINAL DEW CONDENSATION GENERATION AMOUNT WQcon2 | 0 | → | MONOTONE INCREASING |
| --- | --- | --- | --- |
| EGR GAS CORRECTION AMOUNT HOSegr | 0 | → | MONOTONE INCREASING |

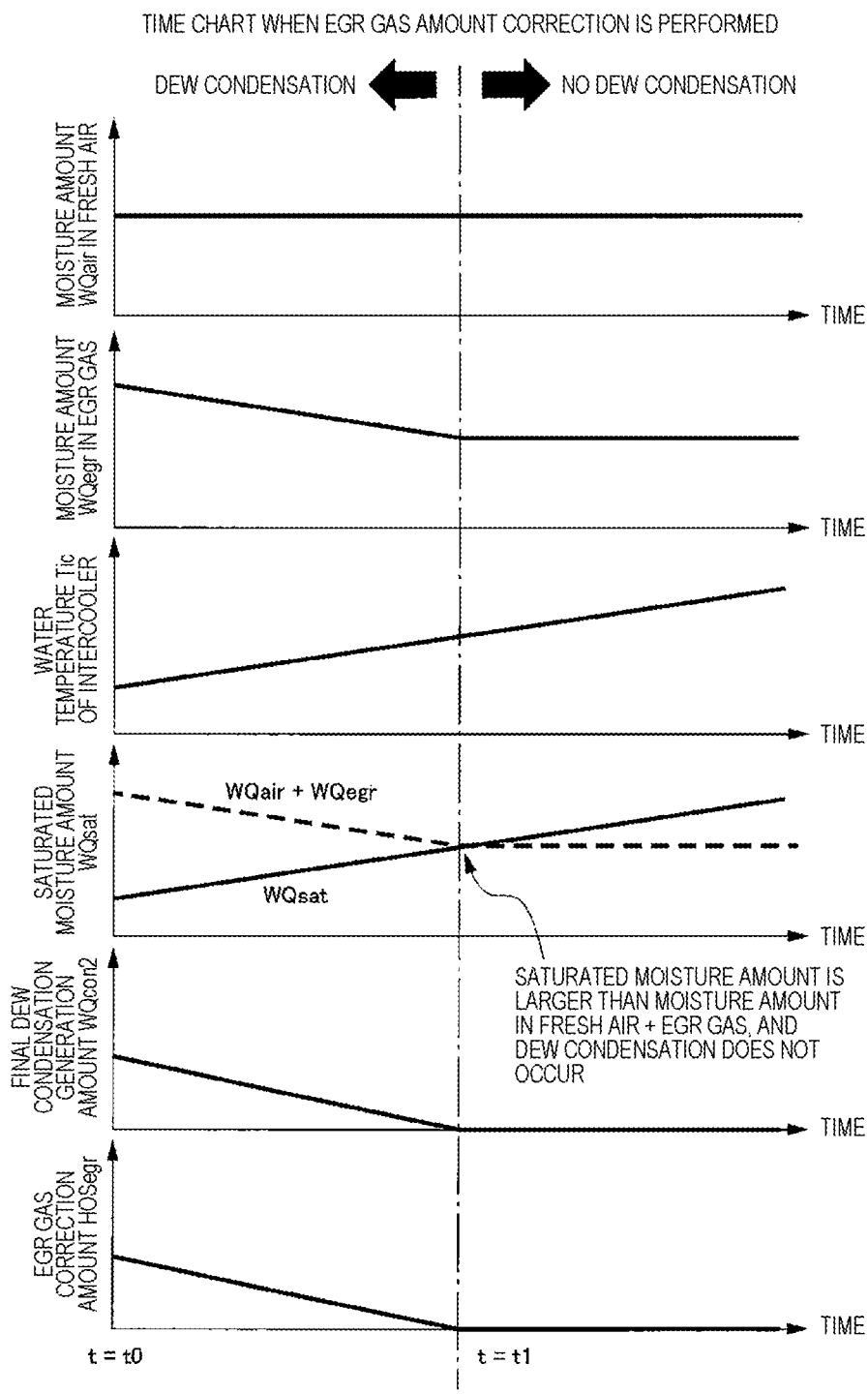

INTERNAL COMBUSTION ENGINE CONTROL DEVICE

TECHNICAL FIELD

The present invention relates to an internal combustion engine control device.

BACKGROUND ART

In recent years, technical development related to improvement of thermal efficiency of an internal combustion engine used for driving a vehicle or driving a generator of a hybrid vehicle by fuel consumption regulation or exhaust regulation has been conducted. As one of the technologies, exhaust gas recirculation (EGR) that recirculates a part of the exhaust gas to the intake system through a dedicated passage has been developed.

By introducing the EGR, the difference between the in-cylinder pressure and the atmospheric pressure during the intake stroke can be reduced and the pump loss can be reduced under a condition where the output of the internal combustion engine is small. In addition, under a condition where the output of the internal combustion engine is relatively large, abnormal combustion (knocking) can be suppressed, and exhaust loss can be reduced. In addition, in recent years, it is desired to increase the introduction amount of EGR into the intake pipe due to an increase in the demand for low fuel consumption of vehicles.

As a technique for estimating the EGR flow rate for recirculation from the exhaust pipe to the intake pipe, for example, there is a technique as described in PTL 1. PTL 1 describes a technique for estimating an EGR flow rate based on an EGR valve opening degree and a differential pressure across the EGR valve.

CITATION LIST

Patent Literature

PTL 1: JP 2001-280202 A

SUMMARY OF INVENTION

Technical Problem

However, the intake pipe is provided with an intercooler that cools the sucked gas. The EGR gas also mixes with fresh air taken in the intake pipe and passes through the intercooler. In addition, when dew condensation occurs in the intercooler, water vapor exceeding the saturated water vapor amount becomes water, but other oxygen, carbon dioxide, nitrogen, and the like remain as gas, and thus the composition of the EGR gas changes. Then, the EGR gas flowing into the combustion chamber decreases by the amount decreased by water vapor.

In addition, in the technique described in PTL 1, since the occurrence of dew condensation in the intercooler is not considered, the EGR flow rate actually flowing into the combustion chamber is smaller than the estimated EGR flow rate. As a result, in the technique described in PTL 1, abnormal combustion such as knocking may occur.

An object of the present invention is to provide an internal combustion engine control device capable of appropriately correcting the flow rate of the EGR gas in consideration of the above problems.

Solution to Problem

In order to solve the above problems and achieve the object, an internal combustion engine control device is an internal combustion engine control device that controls an internal combustion engine including an intercooler that cools intake air and an EGR flow path pipe that recirculates a part of exhaust gas in an exhaust path to an upstream side of the intercooler as EGR gas.

The internal combustion engine control device includes a moisture amount calculation unit, a dew condensation calculation unit, and an EGR correction unit. The moisture amount calculation unit calculates a total moisture amount contained in the mixed gas in which the fresh air flowing into the intercooler and the EGR gas are mixed. The dew condensation calculation unit calculates a dew condensation generation amount in the intercooler based on the total moisture amount calculated by the moisture amount calculation unit. The EGR correction unit corrects the flow rate of the EGR gas to be recirculated based on the dew condensation generation amount calculated by the dew condensation calculation unit.

Advantageous Effects of Invention

According to the internal combustion engine control device having the above configuration, the flow rate of the EGR gas can be appropriately corrected.

BRIEF DESCRIPTION OF DRAWINGS

FIG. 30 is a time chart illustrating an example when an EGR gas correction operation is performed.

DESCRIPTION OF EMBODIMENTS

1. Embodiments

Figure 1:
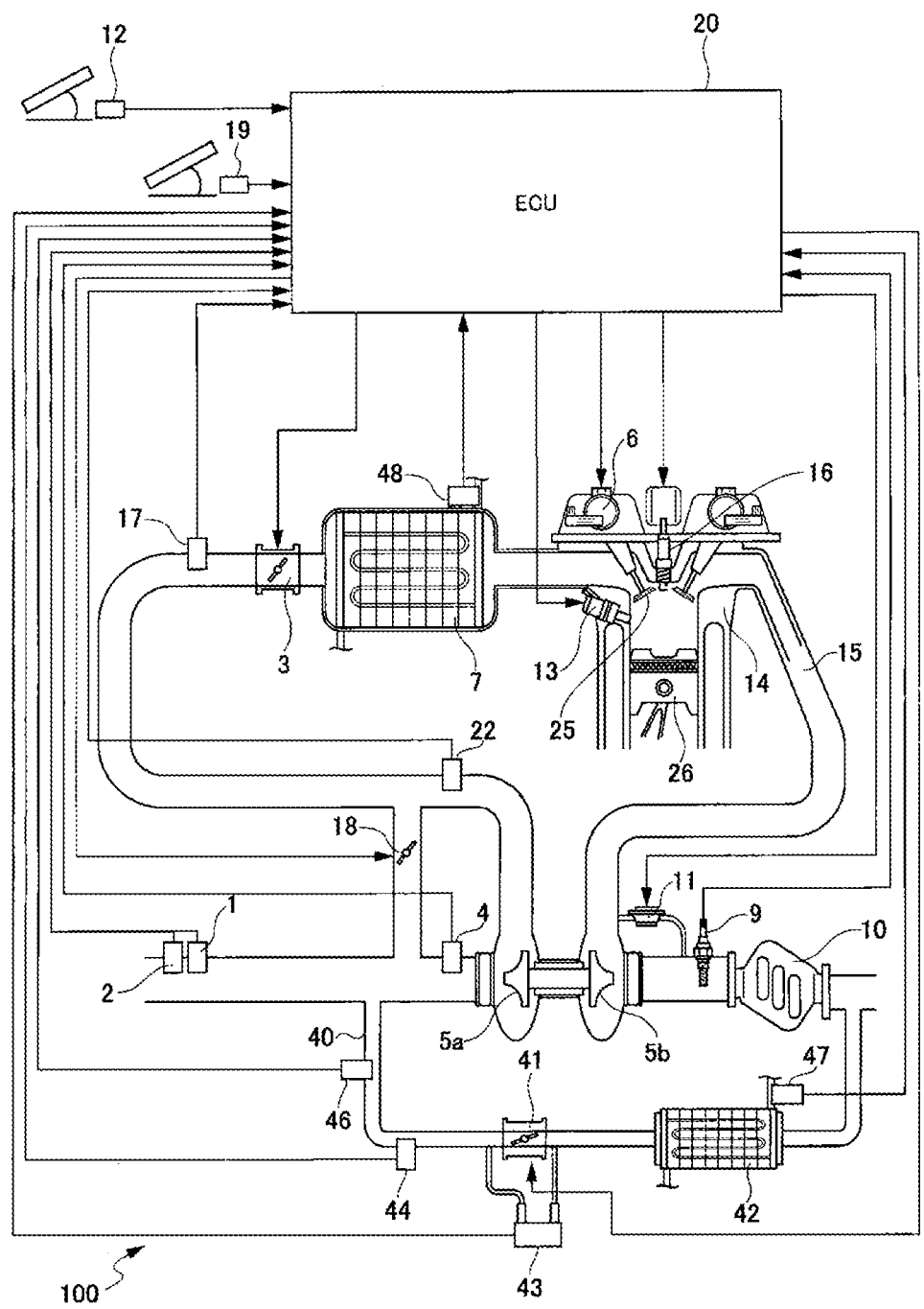
FIG. 1 is a schematic configuration diagram illustrating a system configuration of an internal combustion engine on which an internal combustion engine control device according to an embodiment is mounted.

Hereinafter, an internal combustion engine control device according to an embodiment (hereinafter, referred to as "present example") will be described with reference to FIGS. 1 to 30. The common members in each drawing are designated by the same reference numerals.

1-1. Configuration Example of Internal Combustion Engine

First, a configuration example of an internal combustion engine will be described.

FIG. 1 is a schematic configuration diagram illustrating a system configuration of an internal combustion engine of the present example.

An internal combustion engine 100 illustrated in FIG. 1 is a cylinder injection type internal combustion engine (direct injection engine) that directly injects fuel made of gasoline into a cylinder. The internal combustion engine 100 is a four-cycle engine that repeats four strokes of a suction stroke, a compression stroke, a combustion (expansion) stroke, and an exhaust stroke. Further, the internal combustion engine 100 is, for example, a multi-cylinder engine including four cylinders (cylinders). Note that the number of cylinders included in the internal combustion engine 100 is not limited to four, and may include six or eight or more cylinders. The number of cycles of the internal combustion engine 100 is not limited to 4 cycles.

As illustrated in FIG. 1, the internal combustion engine 100 includes a first humidity sensor 1, an air flow sensor 2, an electronically controlled throttle valve 3, a pressure sensor 4, a compressor 5a, an intercooler 7, an intake air temperature sensor 17, a cylinder 14, and a recirculation valve 18. The first humidity sensor 1, the air flow sensor 2, the electronically controlled throttle valve 3, the pressure sensor 4, the compressor 5a, the intercooler 7, the intake air temperature sensor 17, and the recirculation valve 18 are disposed at positions up to the cylinder 14 in an intake pipe.

The first humidity sensor 1 detects the humidity of the sucked fresh air. The first humidity sensor 1 is disposed on the upstream side of a junction with an EGR flow path pipe 40 to be described later. The air flow sensor 2 measures an intake air amount and an intake air temperature. In the present example, an example in which the first humidity sensor 1 and the air flow sensor 2 are individually provided has been described, but the present invention is not limited thereto, and the humidity of the sucked air may be detected by the air flow sensor 2.

The electronically controlled throttle valve 3 is driven so as to be openable and closable by a drive motor (not illustrated). Then, the opening degree of the electronically controlled throttle valve 3 is adjusted based on the driver's accelerator operation. As a result, the air amount taken into the intercooler 7 and the cylinder 14 is adjusted.

The compressor 5a is a supercharger that supercharges intake air. The rotating force is transmitted to the compressor 5a by a turbine 5b to be described later. A supercharging pressure sensor 22 that detects the pressure of supercharged intake air is provided on the downstream side of the compressor 5a. The intake air temperature sensor 17 detects the temperature of intake air supercharged by the compressor 5a. The recirculation valve 18 adjusts the air amount flowing from the downstream of the compressor 5a to the upstream of the compressor 5a.

The intercooler 7 is disposed on the upstream side of the cylinder 14, and is disposed on the downstream side of the electronically controlled throttle valve 3, the first humidity sensor 1, the air flow sensor 2, and the intake air temperature sensor 17. The intercooler 7 cools the intake air. The intercooler 7 is provided with a water temperature sensor 48 for the intercooler that detects the temperature of the cooling water.

The cylinder 14 is provided with a piston 26, an intake valve 25, an exhaust valve, an injector 13, an ignition plug 16, and a variable valve 6. The piston 26 is slidably disposed in the cylinder of the cylinder 14. The piston 26 compresses a mixed gas of fuel and gas flowing into the cylinder of the cylinder 14. Then, the piston 26 reciprocates in the cylinder of the cylinder 14 by the combustion pressure generated in the cylinder.

The intake valve 25 is disposed to be open and closed in an intake port of the cylinder 14, and the exhaust valve is disposed to be open and closed in an exhaust port of the cylinder 14. The opening/closing amounts of the intake valve 25 and the exhaust valve are adjusted by the variable valve 6. The intake amount and the internal EGR amount of all the cylinders are adjusted by adjusting the variable valve 6.

The injector 13 injects fuel into the cylinder of the cylinder 14 under the control of an internal combustion engine control device (ECU) 20 described later. As a result, a mixed gas in which fuel of air is mixed is generated in the cylinder of the cylinder 14. A high-pressure fuel pump (not illustrated) is connected to the injector 13. Fuel whose pressure is increased by the high-pressure fuel pump is supplied to the injector 13. Further, a fuel pressure sensor for measuring a fuel injection pressure is provided in a fuel pipe connecting the injector 13 and the high-pressure fuel pump.

An ignition coil (not illustrated) is connected to the ignition plug 16. The ignition coil generates a high voltage under the control of the internal combustion engine control device 20 and applies the high voltage to the ignition plug 16. As a result, sparks are generated in the ignition plug 16. Then, the mixed gas in the cylinder burns and explodes by the sparks generated in the ignition plug 16. The piston 26 is pushed down by the exploded mixed gas. The pushing-down motion of the piston 26 is converted into a rotational motion of the crankshaft, and becomes a driving force of the vehicle or the like.

An exhaust pipe 15 is connected to an exhaust port of the cylinder 14. The exhaust pipe 15 is provided with the turbine 5b, an electronically controlled wastegate valve 11, a three-way catalyst 10, and an air-fuel ratio sensor 9. The turbine 5b is rotated by the exhaust gas passing through the exhaust pipe 15, and transmits the rotating force to the compressor 5a. The electronically controlled wastegate valve 11 adjusts an exhaust flow path flowing to the turbine 5b.

The three-way catalyst 10 purifies harmful substances contained in the exhaust gas by an oxidation/reduction reaction. The air-fuel ratio sensor 9 is disposed on the upstream side of the three-way catalyst 10. Then, the air-fuel ratio sensor 9 detects the air-fuel ratio of the exhaust gas passing through the exhaust pipe 15.

In addition, the internal combustion engine 100 includes an EGR flow path pipe 40 that recirculates an exhaust gas (EGR gas) from a position downstream of the three-way catalyst 10 to a position upstream of the compressor 5a and downstream of the air flow sensor 2. The EGR flow path pipe 40 is provided with an EGR cooler 42, an EGR valve 41, a differential pressure sensor 43, and a second humidity sensor 46.

The EGR cooler 42 cools the EGR gas. The EGR cooler 42 is provided with a water temperature sensor 47 for the EGR cooler that detects the temperature of the cooling water. The EGR valve 41 controls an EGR flow rate for adjusting the flow rate of the EGR gas passing through the EGR flow path pipe 40. The differential pressure sensor 43 that detects a differential pressure before and after the EGR valve 41 is attached in the vicinity of the EGR valve 41. Here, the differential pressure before and after the EGR valve 41 is a difference between the pressure on the upstream side of the EGR valve 41 and the pressure on the downstream side in the EGR flow path pipe 40.

An EGR temperature sensor 44 is disposed downstream of the EGR valve 41. The EGR temperature sensor 44 detects the temperature of the EGR gas flowing through the EGR flow path pipe 40. The second humidity sensor 46 is disposed downstream of the EGR valve 41, and detects the humidity of the EGR gas flowing through the EGR flow path pipe 40. The second humidity sensor 46 is provided between the EGR valve 41 and a junction where the EGR gas recirculates to the intake air.

A part of the exhaust gas purified by the three-way catalyst 10 flows into the EGR flow path pipe 40 without being discharged to the outside, and is used as the EGR gas. After passing through the EGR cooler 42 and the EGR valve 41, the EGR gas joins the intake fresh air upstream of the compressor 5a. Thereafter, the mixed gas of the EGR gas and the fresh air flows into the cylinder 14 after passing through the intercooler 7 and the electronically controlled throttle valve 3.

Signals detected by the respective sensors such as the first humidity sensor 1, the air flow sensor 2, the pressure sensor 4, the intake air temperature sensor 17, and the supercharging pressure sensor 22 are sent to the internal combustion engine control device 20 which is an engine control unit (ECU). In addition, a signal detected by an accelerator opening degree sensor 12 that detects the depression amount of an accelerator pedal, that is, the accelerator opening degree is also sent to the internal combustion engine control device 20. Further, a signal detected by a brake switch 19 that detects that the brake is stepped on is also sent to the internal combustion engine control device 20.

The internal combustion engine control device 20 calculates a required torque based on the main signal of the accelerator opening degree sensor 12. That is, the accelerator opening degree sensor 12 is used as a required torque detection sensor that detects a required torque to the internal combustion engine 100. In addition, the internal combustion engine control device 20 calculates the rotational speed of the internal combustion engine 100 based on an output signal of a crank angle sensor (not illustrated). Then, the internal combustion engine control device 20 optimally calculates main operation amounts of the internal combustion engine 100 such as an air flow rate, a fuel injection amount, an ignition timing, and a fuel pressure based on an operation state of the internal combustion engine 100 obtained from outputs of various sensors.

The fuel injection amount calculated by the internal combustion engine control device 20 is converted into a valve opening pulse signal and output to the injector 13. In addition, the ignition timing calculated by the internal combustion engine control device 20 is output to the ignition plug 16 as an ignition signal. Further, a throttle opening degree calculated by the internal combustion engine control device 20 is output to the electronically controlled throttle valve 3 as a throttle drive signal. An EGR valve opening degree calculated by the internal combustion engine control device 20 is output to the EGR valve 41 as an EGR valve opening drive signal.

1-2. Configuration Example of Internal Combustion Engine Control Device 20

Next, a configuration example of the internal combustion engine control device 20 will be described with reference to FIG. 2.

Figure 2:
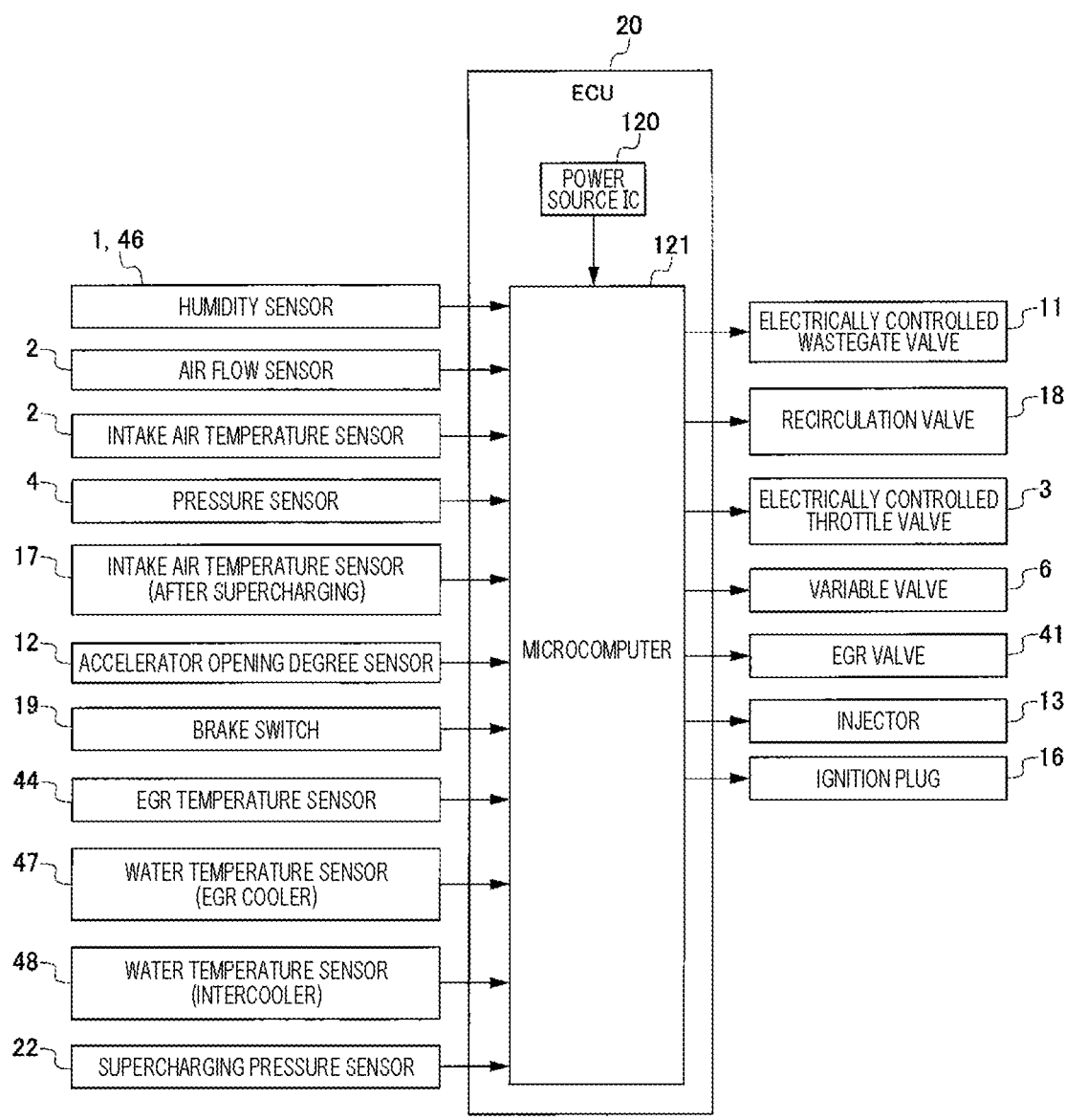
FIG. 2 is a block diagram illustrating a configuration of the internal combustion engine control device according to the embodiment.

FIG. 2 is a block diagram illustrating a configuration of the internal combustion engine control device 20.

As illustrated in FIG. 2, the internal combustion engine control device 20 which is an engine control unit (ECU) includes a microcomputer 121 having a central processing unit (CPU) illustrating an example of a control unit, and a power source IC 120 that controls power supplied to the microcomputer 121. In addition, the internal combustion engine control device 20 performs calculation by digitally converting an output value of each sensor by an A/D converter built in the microcomputer 121 or a timer that detects a cycle of a periodic signal. Then, the internal combustion engine control device 20 controls each actuator by outputting a calculation result as a control signal.

Examples of the signal input to the internal combustion engine control device 20 include output signals of the humidity sensors 1 and 46, the air flow sensor (intake air temperature sensor) 2, the pressure sensor 4, the intake air temperature sensor 17, the accelerator opening degree sensor 12, the brake switch 19, the EGR temperature sensor 44, and the like. Examples of the signal input to the internal combustion engine control device 20 include output signals of the water temperature sensor 47 for the EGR cooler 42, the water temperature sensor 48 for the intercooler 7, the supercharging pressure sensor 22, and the like.

Further, the signal calculated by the internal combustion engine control device 20 is output to, for example, the electronically controlled wastegate valve 11, the recirculation valve 18, the electronically controlled throttle valve 3, the variable valve 6, the EGR valve 41, the injector 13, the ignition plug 16, and the like.

In addition, the internal combustion engine control device 20 calculates the moisture amount contained in the EGR gas based on the output signals from the various sensors, and calculates the EGR gas correction amount. Then, the internal combustion engine control device 20 controls the drive of the EGR valve 41 based on the calculated EGR gas correction amount.

1-3. Configuration Example of EGR Gas Correction Process in Internal Combustion Engine Control Device 20

Next, a configuration example of the EGR gas correction process in the internal combustion engine control device 20 will be described with reference to FIG. 3.

Figure 3:
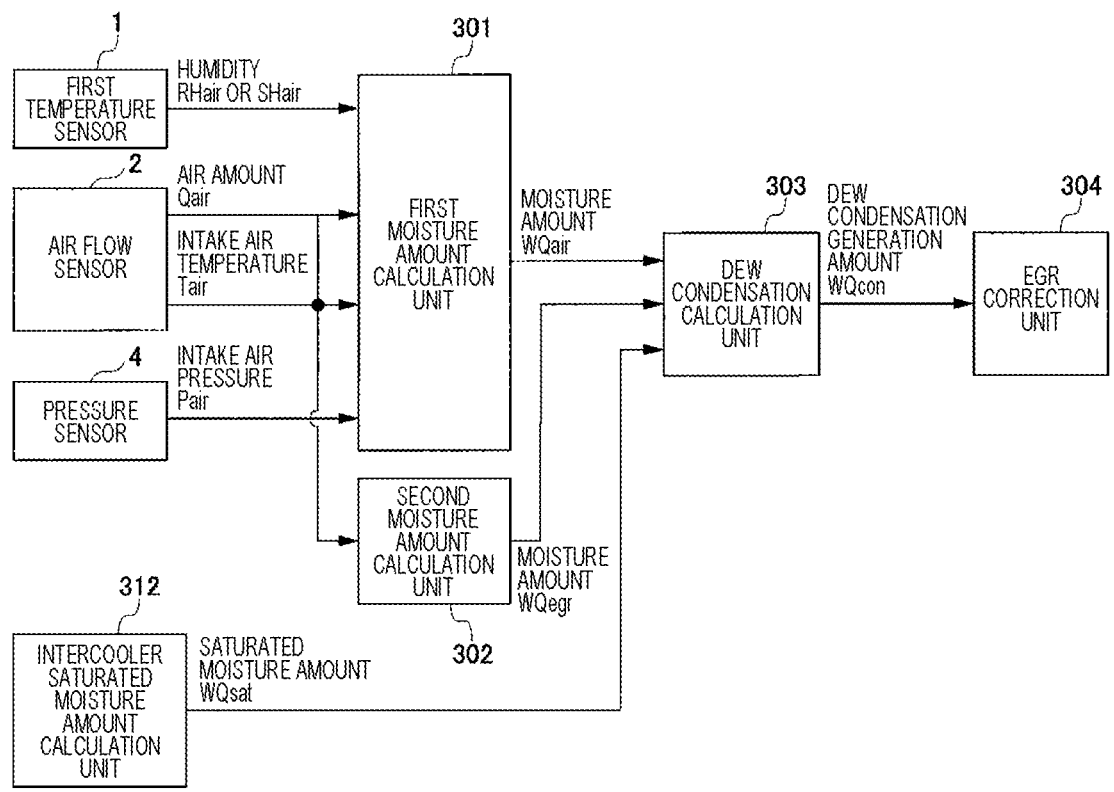
FIG. 3 is a block diagram illustrating a configuration of an EGR gas correction process in the internal combustion engine control device according to the embodiment.

FIG. 3 is a block diagram illustrating a configuration of an EGR gas correction process in the internal combustion engine control device 20.

As illustrated in FIG. 3, the internal combustion engine control device 20 includes a first moisture amount calculation unit 301, a second moisture amount calculation unit 302, a dew condensation calculation unit 303, an EGR correction unit 304, and an intercooler saturated moisture amount calculation unit 312.

The first moisture amount calculation unit 301 calculates the moisture amount contained in the sucked fresh air at the position of the first humidity sensor 1 based on the humidity information detected by the first humidity sensor 1, the air amount detected by the air flow sensor 2, the intake air temperature information, the pressure information detected by the pressure sensor 4, and the like. Hereinafter, the moisture amount calculated by the first moisture amount calculation unit 301 is referred to as a first moisture amount. A method of calculating the first moisture amount in the first moisture amount calculation unit 301 will be described later. The first moisture amount calculation unit 301 outputs the calculated first moisture amount to the dew condensation calculation unit 303.

The moisture amount calculated by the internal combustion engine control device 20 of the present example is a mass flow rate of water vapor flowing per unit time.

The second moisture amount calculation unit 302 calculates the moisture amount contained in the EGR gas that has passed through the EGR cooler 42. Hereinafter, the moisture amount calculated by the second moisture amount calculation unit 302 is referred to as a second moisture amount. A method of calculating the second moisture amount in the second moisture amount calculation unit 302 will be described later. The second moisture amount calculation unit 302 outputs the calculated second moisture amount to the dew condensation calculation unit 303.

The intercooler saturated moisture amount calculation unit 312 calculates a saturated absolute humidity which is an absolute humidity when dew condensation occurs in the intercooler 7 and a saturated moisture amount which is a moisture amount when dew condensation occurs. A method of calculating the saturated absolute humidity and the saturated moisture amount in the intercooler saturated moisture amount calculation unit 312 will be described later. The intercooler saturated moisture amount calculation unit 312 outputs the calculated saturated moisture amount to the dew condensation calculation unit 303.

After recirculating the EGR gas into the intake air, the EGR gas mixed with the fresh air is supercharged by the compressor 5a, has a high temperature and a high pressure, and is then cooled by the intercooler 7. Dew condensation may occur in the intercooler 7 due to the relationship between the state of the gas before passing through the intercooler 7 (temperature, pressure, moisture amount) and the temperature of the cooling water flowing through the intercooler 7. Then, the dew condensation calculation unit 303 calculates a dew condensation generation amount in the intercooler 7.

The dew condensation calculation unit 303 calculates the dew condensation generation amount in the intercooler 7 from the relationship among the first moisture amount, the second moisture amount, and the saturated moisture amount of the intercooler 7. Then, the dew condensation calculation unit 303 outputs the calculated dew condensation generation amount to the EGR correction unit 304.

The EGR correction unit 304 determines whether dew condensation occurs in the intercooler 7 based on the dew condensation generation amount received from the dew condensation calculation unit 303. In addition, the EGR correction unit 304 calculates the EGR gas correction amount based on the determination result, the dew condensation generation amount, and the target EGR rate. The EGR correction unit 304 calculates an EGR valve opening degree command value for realizing the calculated EGR correction amount. The EGR correction unit 304 outputs the calculated EGR valve opening degree command value to the EGR valve 41. A method of calculating the EGR gas correction amount in the EGR correction unit 304 will be described later.

The target EGR rate is an EGR rate before being corrected by the EGR correction unit 304.

2. Configuration Example of Operation of Calculating First Moisture Amount

2-1. First Embodiment

Next, a first embodiment in the operation of calculating the first moisture amount will be described with reference to FIGS. 4 and 5.

Figure 4:
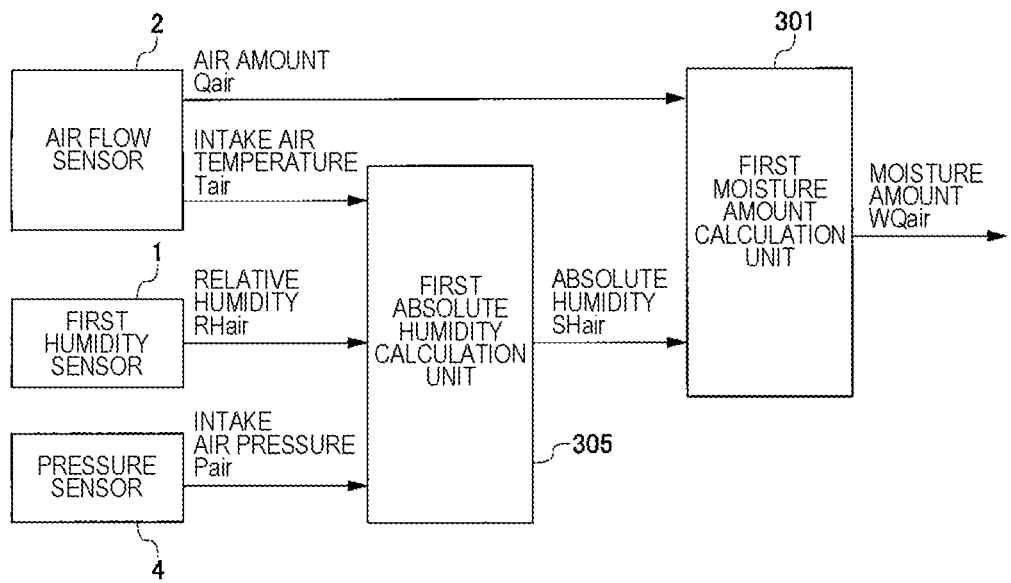
FIG. 4 is a block diagram illustrating a configuration around a first moisture amount calculation unit according to a first embodiment.

FIG. 4 is a block diagram illustrating a configuration around the first moisture amount calculation unit 301 according to the first embodiment. FIG. 5 is a flowchart illustrating an operation of calculating the first moisture amount in the first embodiment.

As illustrated in FIG. 4, the first moisture amount calculation unit 301 is connected to the air flow sensor 2 and a first absolute humidity calculation unit 305. The first absolute humidity calculation unit 305 is connected to the air flow sensor 2, the first humidity sensor 1, and the pressure sensor 4. The first humidity sensor 1 in the example illustrated in FIG. 4 detects a relative humidity RHair as humidity information. Then, the first humidity sensor 1 outputs the relative humidity RHair to the first absolute humidity calculation unit 305. The relative humidity indicates the ratio to the saturated water vapor pressure that indicates the limit at which water can exist as a gas (water vapor). Note that the mass that can be present as water vapor greatly varies depending on the temperature and pressure conditions, and thus needs to be converted into absolute humidity.

An intake air temperature Tair detected by the air flow sensor 2 and an intake air pressure Pair detected by the pressure sensor 4 are output to the first absolute humidity calculation unit 305. Then, the first absolute humidity calculation unit 305 calculates the saturated water vapor pressure Psair and the absolute humidity SHair in the fresh air using the relative humidity RHair, the intake air temperature Tair, and the intake air pressure Pair.

The saturated water vapor pressure Psair is calculated by the following Expression 1 using the Tetens equation. The unit of the saturated water vapor pressure Psair and the intake air pressure Pair is hPa, and the unit of the intake air temperature Tair is degC.

$$P_{sair} = 6.1078 \times 10^{\frac{7.5 \times T_{air}}{237.3 + T_{air}}} \times \frac{1013}{P_{air}} \quad \text{[Math. 1]}$$

The absolute humidity SHair in the fresh air is calculated from the saturated water vapor pressure Psair, the relative humidity RHair, and the intake air temperature Tair by the following Expression 1. The unit of the absolute humidity SHair is g/m³, and the unit of the relative humidity RHair is dimensionless.

$$SH_{air} = 217 \times \frac{P_{sair} \times RH_{air}}{T_{air} + 273.15} \quad \text{[Math. 2]}$$

Then, the first absolute humidity calculation unit 305 outputs the calculated absolute humidity SHair to the first moisture amount calculation unit 301. The first moisture amount calculation unit 301 calculates the moisture amount in the fresh air, that is, a first moisture amount WQair based on an air amount Qair which is the detection value of the air flow sensor 2, the absolute humidity SHair in the fresh air calculated by the first absolute humidity calculation unit 305, and an air density Dair. The first moisture amount WQair is calculated by the following Expression 3. The unit of the first moisture amount WQair and the air amount Qair is g/s, and the unit of the air density Dair is kg/m³.

$$WQ_{air} = \frac{Q_{air}}{1000} \times \frac{SH_{air}}{D_{air}} \quad \text{[Math. 3]}$$

Next, an operation of calculating the first moisture amount WQair will be described with reference to FIG. 5.

Figure 5:
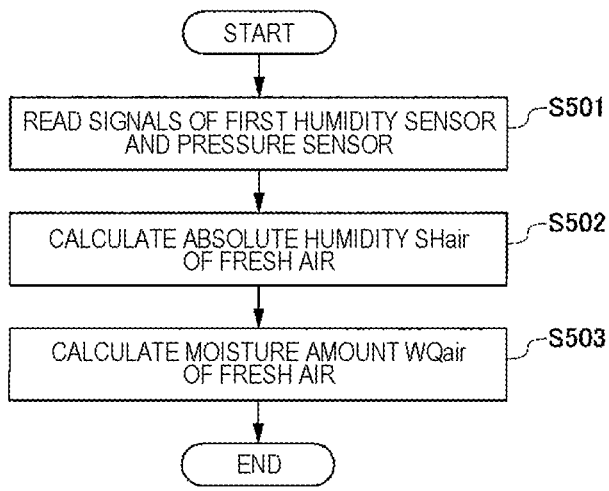
FIG. 5 is a flowchart illustrating an operation of calculating a first moisture amount according to the first embodiment.

As illustrated in FIG. 5, the first absolute humidity calculation unit 305 of the internal combustion engine control device 20 reads signals from the first humidity sensor 1 and the pressure sensor 4 (Step S501). That is, the first absolute humidity calculation unit 305 acquires the relative humidity RHair detected by the first humidity sensor 1 and the intake air pressure Pair detected by the pressure sensor 4. In the process of Step S501, the first absolute humidity calculation unit 305 acquires the intake air temperature Tair from the air flow sensor 2.

Next, the first absolute humidity calculation unit 305 calculates the absolute humidity SHair of the fresh air based on the signal acquired in Step S501 (S502). In the process of Step S502, the first absolute humidity calculation unit 305 calculates the saturated water vapor pressure Psair in the fresh air using the above Expression 1. Then, the first absolute humidity calculation unit 305 calculates the absolute humidity SHair in the fresh air using the calculated saturated water vapor pressure Psair and the above Expression 2. The first absolute humidity calculation unit 305 outputs the calculated absolute humidity SHair to the first moisture amount calculation unit 301.

Next, the first moisture amount calculation unit 301 calculates the first moisture amount WQair in the fresh air using the absolute humidity SHair and the above Expression 3 (Step S503). In the process of Step S503, the first moisture amount calculation unit 301 acquires the air amount Qair from the air flow sensor 2. As a result, the operation of calculating the first moisture amount WQair is completed. As illustrated in FIG. 3, the first moisture amount calculation unit 301 outputs the calculated first moisture amount WQair to the dew condensation calculation unit 303.

2-2. Second Embodiment

Next, a second embodiment in the operation of calculating the first moisture amount will be described with reference to FIGS. 6 and 7.

Figure 6:
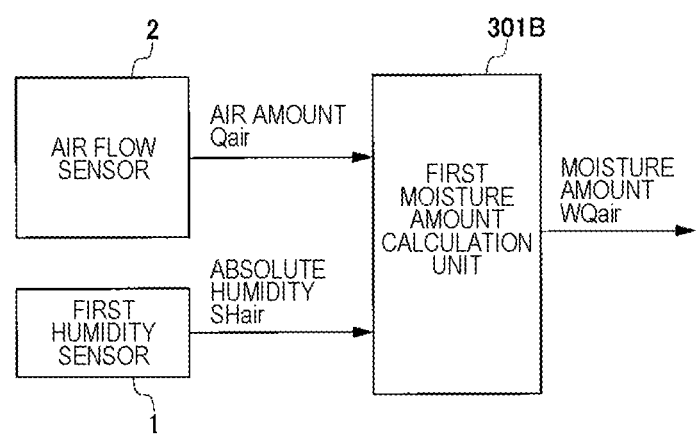
FIG. 6 is a block diagram illustrating a configuration of a first moisture amount calculation unit according to a second embodiment.

FIG. 6 is a block diagram illustrating a configuration around a first moisture amount calculation unit 301B according to the second embodiment. FIG. 7 is a flowchart illustrating an operation of calculating the first moisture amount in the second embodiment.

In the second embodiment, the first humidity sensor 1 detects the absolute humidity SHair as humidity information. As illustrated in FIG. 6, the air amount Qair detected by the air flow sensor 2 and the absolute humidity SHair detected by the first humidity sensor 1 are output to the first moisture amount calculation unit 301B.

Next, an operation of calculating the first moisture amount WQair will be described with reference to FIG. 7.

Figure 7:
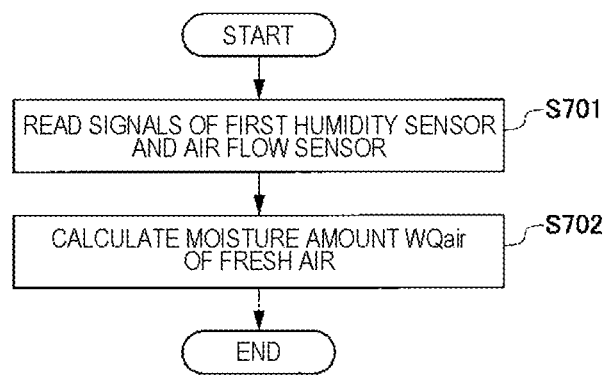
FIG. 7 is a block diagram illustrating a configuration of the first moisture amount calculation unit according to the second embodiment.

As illustrated in FIG. 7, the first moisture amount calculation unit 301B of the internal combustion engine control device 20 reads signals from the first humidity sensor 1 and the air flow sensor 2 (Step S701). That is, the first moisture amount calculation unit 301B acquires the absolute humidity SHair detected by the first humidity sensor 1 and the air amount Qair detected by the air flow sensor 2.

Next, the first moisture amount calculation unit 301B calculates the first moisture amount WQair in the fresh air using the absolute humidity SHair, the air amount Qair, and the above Expression 3 (Step S702). As a result, the operation of calculating the first moisture amount WQair is completed. The first moisture amount calculation unit 301B outputs the calculated first moisture amount WQair to the dew condensation calculation unit 303.

3. Configuration Example of Operation of Calculating Second Moisture Amount

3-1. First Embodiment

Next, a first embodiment in the operation of calculating the second moisture amount will be described with reference to FIGS. 8 to 10.

Figure 8:
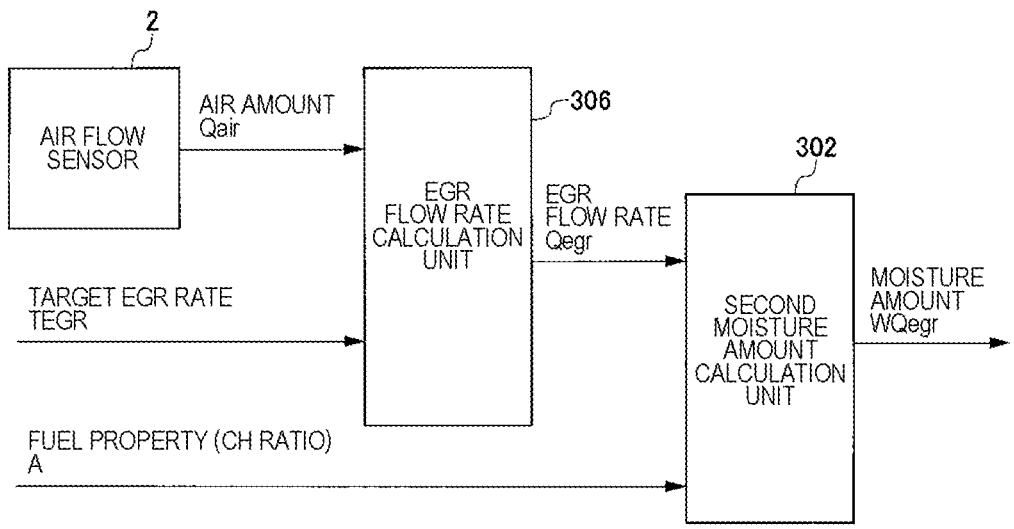
FIG. 8 is a block diagram illustrating a configuration around a second moisture amount calculation unit according to the first embodiment.

FIG. 8 is a block diagram illustrating a configuration around the second moisture amount calculation unit 302 according to the first embodiment.

As illustrated in FIG. 8, an EGR flow rate calculation unit 306 is connected to the second moisture amount calculation unit 302. The EGR flow rate calculation unit 306 calculates the flow rate of the EGR gas (EGR flow rate Qegr). The air flow sensor 2 is connected to the EGR flow rate calculation unit 306, and the air amount Qair which is a detection value of the air flow sensor 2 is output. In addition, the EGR flow rate calculation unit 306 outputs the target EGR rate TEGR calculated by the internal combustion engine control device 20.

Since the EGR rate is the ratio of the exhaust gas recirculated to the intake air, the EGR rate is defined by the following Expression 4 from the ratio of the exhaust gas flow rate Qair+the EGR flow rate Qegr and the EGR flow rate Qegr.

$$TEGR = \frac{Q_{egr}}{Q_{air} + Q_{egr}} \quad [\text{Math. 4}]$$

By converting Expression 4 into an equation for obtaining the EGR gas flow rate Qegr, the following Expression 5 can be obtained.

$$Q_{egr} = \frac{TEGR}{1 - TEGR} \times Q_{air} \quad [\text{Math. 5}]$$

Here, as described above, the target EGR rate is an EGR rate before the correction in the EGR correction unit 304 is reflected. The unit of the air amount Qair and the EGR flow rate Qegr is g/s, and the unit of the target EGR rate TEGR is dimensionless.

Then, the EGR flow rate calculation unit 306 outputs the calculated EGR flow rate Qegr to the second moisture amount calculation unit 302.

The EGR flow rate Qegr calculated by the EGR flow rate calculation unit 306 and the fuel property are output to the second moisture amount calculation unit 302. The fuel property is a property of the currently supplied fuel and is determined by the internal combustion engine control device 20. The fuel property may be a determination result of regular or high octane, or may be RON (octane number).

Figure 9:
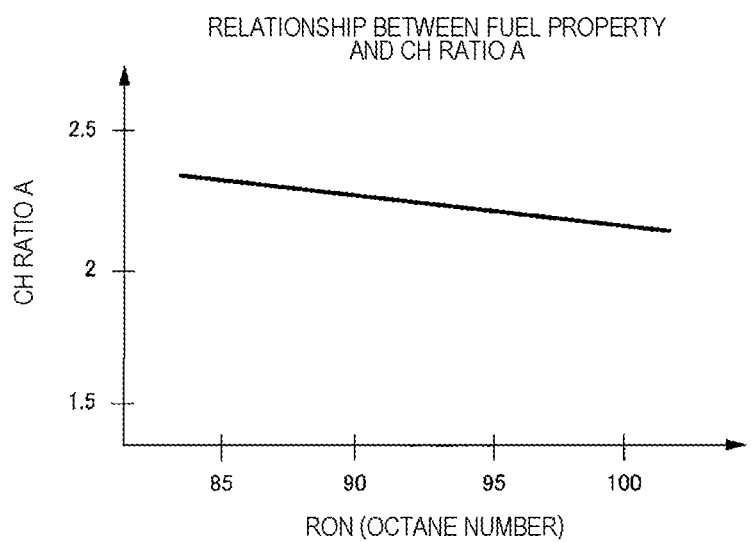
FIG. 9 is a diagram illustrating a relationship between an octane number and a CH ratio.

FIG. 9 is a graph illustrating the relationship between an octane number and a CH ratio A.

The CH ratio A indicates the ratio of H to the saturated hydrocarbon C as a fuel component. As illustrated in FIG. 9, the CH ratio A tends to decrease as the octane number increases. In general, when the regular fuel and the high octane fuel are compared, the high octane fuel tends to have a higher octane number.

Therefore, when the determination of the fuel property is performed with the octane number, the internal combustion engine control device 20 stores the graph illustrated in FIG. 9 in the memory. Then, the internal combustion engine control device 20 obtains the CH ratio A from the graph illustrated in FIG. 9.

When the fuel property is determined by determining the regular fuel and the high octane fuel, the CH ratio A between the regular fuel and the high octane fuel is stored in advance in the memory of the internal combustion engine control device 20. Thus, the CH ratio A can be obtained by determining whether the current fuel is regular fuel or high octane fuel.

When the CH ratio A is determined, the ratio of the gas composition generated by combustion of the fuel can be obtained. That is, a moisture amount WQegr contained in the EGR gas can be obtained.

First, when the volume ratio of nitrogen and oxygen in the air is 79 to 21, the chemical formula of combustion of the fuel CnHm is the following Expression 6.

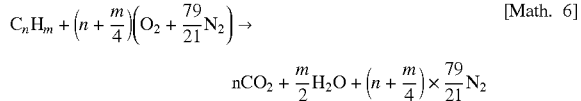

Here, when the CH ratio is A, A is the following Expression 7.

$$A = \frac{H}{C} = \frac{m}{n} \quad [\text{Math. 7}]$$

When Expression 7 is substituted into Expression 6, the following Expression 8 is obtained.

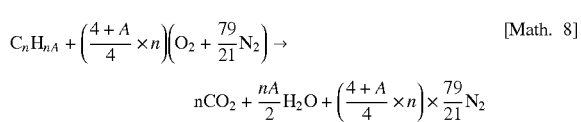

According to Expression 8, the volume fraction of $CO_2$, $H_2O$, and $N_2$ in the exhaust gas is the following Expression 9.

$$CO_2:H_2O:N_2 = n : \frac{nA}{2} : \frac{4+A}{4} \times n \times \frac{79}{21} = 1 : \frac{A}{2} : \frac{4+A}{4} \times \frac{79}{21} \quad [\text{Math. 9}]$$

Therefore, amass ratio RATEw of water vapor in the exhaust gas generated by combustion is obtained by the following Expression 10. Here, [$CO_2$] represents a molecular weight of carbon dioxide of 44 g/mol, [$H_2O$] represents a molecular weight of water of 18 g/mol, and [$N_2$] represents a molecular weight of nitrogen of 28 g/mol.

$$RATE_w = \frac{\frac{A}{2} \times [H_2O]}{1 \times [CO_2] + \frac{A}{2} \times [H_2O] + \frac{4+A}{4} \times \frac{79}{21} \times [N_2]} \quad [\text{Math. 10}]$$

$$= \frac{27 \times A}{448 + 106 \times A}$$

Here, as illustrated in Expression 10, it can be seen that the mass ratio of water vapor in the exhaust gas is determined only by the CH ratio A. Therefore, the second moisture amount calculation unit 302 can calculate the moisture amount in the EGR gas, that is, the second moisture amount WQegr by using Expression 11. Here, the unit of the second moisture amount WQegr in the EGR gas is g/s. In addition, the second moisture amount calculation unit 302 outputs the calculated second moisture amount WQegr to the dew condensation calculation unit 303.

$$WQ_{egr} = Q_{egr} \times RATE_w \qquad \text{[Math. 11]}$$

Next, an operation of calculating the second moisture amount WQegr will be described with reference to FIG. 10.

Figure 10:
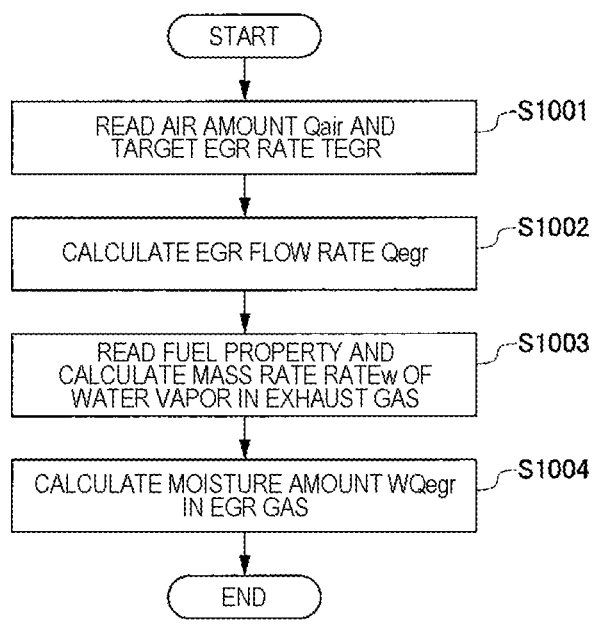
FIG. 10 is a flowchart illustrating an operation of calculating a second moisture amount according to the first embodiment.

FIG. 10 is a flowchart illustrating the operation of calculating the second moisture amount WQegr in the first embodiment.

As illustrated in FIG. 10, the EGR flow rate calculation unit 306 acquires the air amount Qair from the air flow sensor 2 and reads the target EGR rate TEGR from the internal combustion engine control device 20 (Step S1001). Next, the EGR flow rate calculation unit 306 calculates the EGR flow rate Qegr using the air amount Qair, the target EGR rate TEGR, and Expression 5 above (Step S1002). Then, the EGR flow rate calculation unit 306 outputs the calculated EGR flow rate Qegr to the second moisture amount calculation unit 302.

Next, the second moisture amount calculation unit 302 reads the determination result of the fuel property from the internal combustion engine control device 20. Then, the second moisture amount calculation unit 302 calculates the mass ratio RATEw of water vapor in the exhaust gas by Expression 10 (Step S1003). As described above, when the determination of the fuel property is performed from the determination of the regular fuel and the high octane fuel, the CH ratio A can be obtained by storing the CH ratio A corresponding to the determination result in advance in the memory. When the fuel property is determined by the octane number, the CH ratio A can be obtained from the graph illustrated in FIG. 9. Although the example of determining the fuel property has been described, the present invention is not limited thereto, and for example, the CH ratio A may be stored as a fixed value in a memory assuming a general fuel property without determining the fuel property.

Next, the second moisture amount calculation unit 302 calculates the second moisture amount WQegr based on the EGR flow rate Qegr acquired from the EGR flow rate calculation unit 306, the mass ratio RATEw of water vapor in the exhaust gas calculated in Step S1003, and Expression 11 (S1004). As a result, the operation of calculating the second moisture amount WQegr is completed. The second moisture amount calculation unit 302 outputs the calculated second moisture amount WQegr to the dew condensation calculation unit 303.

As described above, according to the operation of calculating the second moisture amount WQegr of the first embodiment, since the second moisture amount WQegr can be obtained from the fuel property (CH ratio A), it is not necessary to provide the second humidity sensor 46, and the number of parts can be reduced.

3-2. Second Embodiment

Next, a second embodiment in the operation of calculating the second moisture amount will be described with reference to FIGS. 11 to 13.

Figure 11:
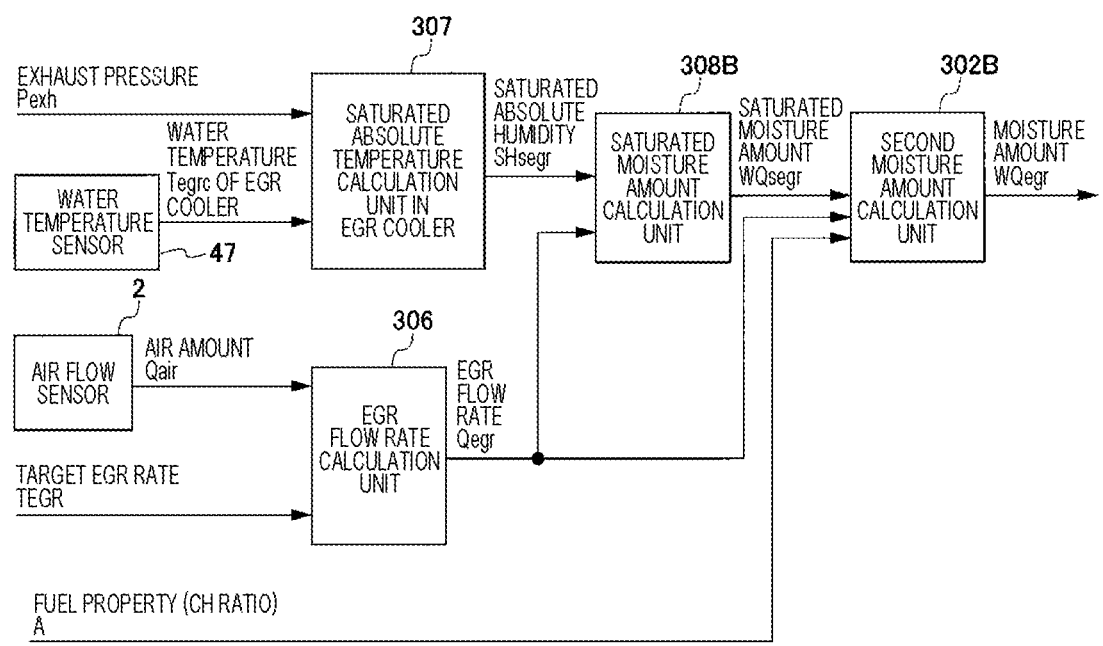
FIG. 11 is a block diagram illustrating a configuration around a second moisture amount calculation unit according to the second embodiment.

FIG. 11 is a block diagram illustrating a configuration around a second moisture amount calculation unit 302B in the second embodiment.

The calculation operation according to the second embodiment takes dew condensation of the EGR cooler 42 into consideration. As illustrated in FIG. 11, an EGR flow rate calculation unit 306 and a saturated moisture amount calculation unit 308B are connected to the second moisture amount calculation unit 302B. A saturated absolute humidity calculation unit 307 and the EGR flow rate calculation unit 306 are connected to the saturated moisture amount calculation unit 308B.

The saturated absolute humidity calculation unit 307 calculates the saturated absolute humidity SHsegr in the EGR cooler 42. The saturated absolute humidity calculation unit 307 outputs a cooling water temperature Tegrc detected by the water temperature sensor 47 that detects the temperature of the cooling water of the EGR cooler 42. Then, the saturated absolute humidity calculation unit 307 calculates a saturated absolute humidity SHsegr in the EGR cooler 42 based on the exhaust pressure Pexh and the cooling water temperature Tegrc.

Here, the saturated absolute humidity SHsegr is a limit absolute humidity at which dew condensation does not occur in the EGR cooler 42. The unit of the saturated absolute humidity SHsegr is g/m³. The exhaust pressure Pexh may be estimated from an operating condition, or may be directly measured by mounting a sensor. When the exhaust pressure Pexh is estimated from the operating condition, for example, a map having the rotation speed of the crankshaft and the load as axes may be created in advance, and the exhaust pressure Pexh may be estimated from the map.

Figure 12:
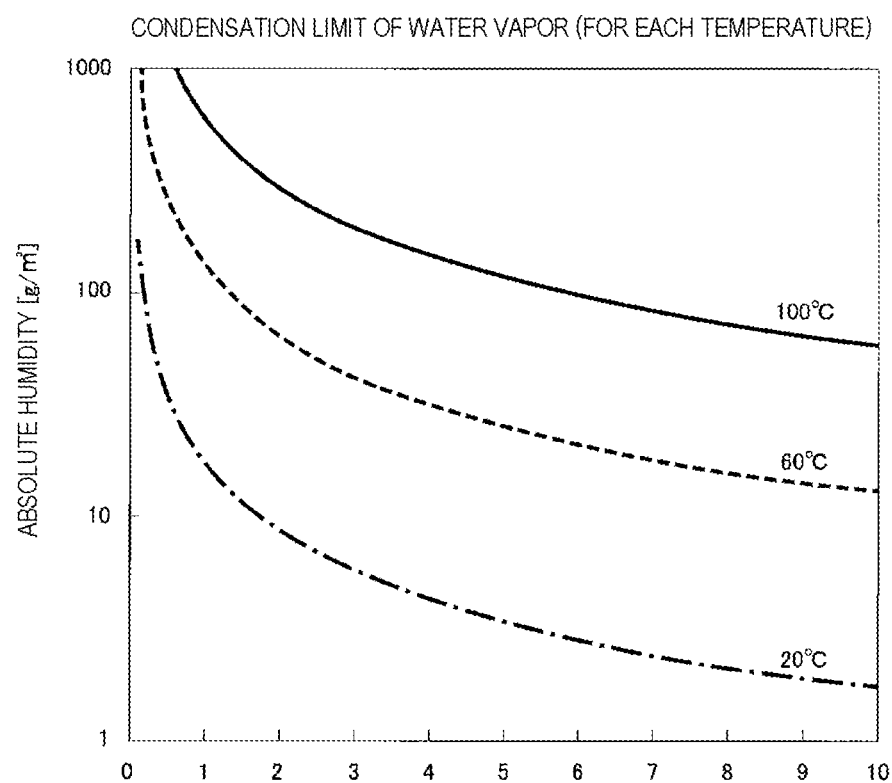
FIG. 12 is a graph illustrating a relationship among pressure, absolute humidity, and condensation limit temperature.

FIG. 12 is a graph illustrating a relationship among pressure, absolute humidity, and condensation limit temperature. The horizontal axis represents pressure, and the vertical axis represents absolute humidity. From the graph illustrated in FIG. 12, it can be seen whether dew condensation occurs when the pressure and the absolute humidity are determined under a certain temperature condition. In addition, if the pressure and the temperature are known, the absolute humidity at the temperature can be obtained. Then, the saturated absolute humidity calculation unit 307 calculates the saturated absolute humidity SHsegr in the EGR cooler 42 from the graph illustrated in FIG. 12, and outputs the calculated saturated absolute humidity SHsegr to the saturated moisture amount calculation unit 308B.

The saturated moisture amount calculation unit 308B calculates a saturated moisture amount WQsegr in the EGR cooler 42 based on the saturated absolute humidity SHsegr and the EGR flow rate Qegr output from the EGR flow rate calculation unit 306. The saturated moisture amount WQsegr indicates the maximum value of the mass flow rate of water vapor that can be present in the EGR gas when dew condensation occurs in the EGR cooler 42. The saturated moisture amount WQsegr is calculated from the following Expression 12. Here, Degr is the density of the exhaust gas, and the unit is kg/m³. The unit of the saturated moisture amount WQsegr is g/s.

$$WQ_{segr} = \frac{Q_{egr}}{1000} \times \frac{SH_{segr}}{D_{egr}} \qquad \text{[Math. 12]}$$

The saturated moisture amount calculation unit 308B outputs the calculated saturated moisture amount WQsegr to the second moisture amount calculation unit 302B. The second moisture amount calculation unit 302B compares the moisture amount in the EGR gas calculated by Expression 11 with the saturated moisture amount WQsegr calculated by Expression 12, and selects a small value. This selected value is the second moisture amount WQegr output from the second moisture amount calculation unit 302B.

Next, an operation of calculating the second moisture amount WQegr will be described with reference to FIG. 13.

Figure 13:
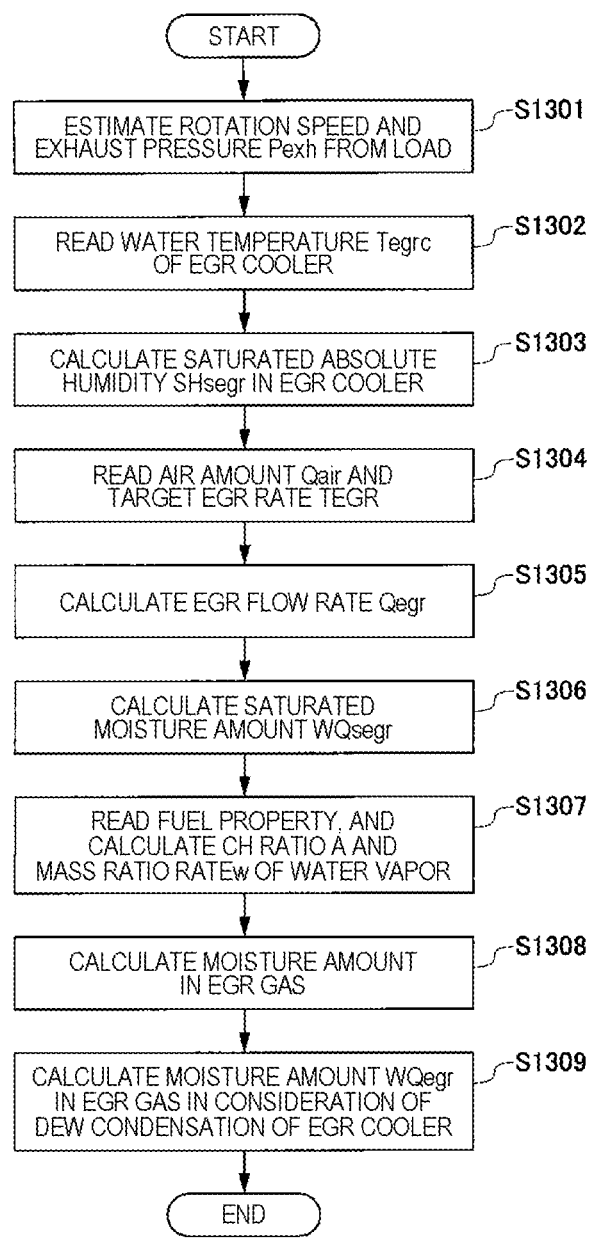
FIG. 13 is a flowchart illustrating an operation of calculating the second moisture amount according to the second embodiment.

FIG. 13 is a flowchart illustrating the operation of calculating the second moisture amount WQegr in the second embodiment.

As illustrated in FIG. 13, first, the internal combustion engine control device 20 calculates the exhaust pressure Pexh from the rotation speed of the crankshaft and the load (Step S1301). Then, the calculated exhaust pressure Pexh is output to the saturated absolute humidity calculation unit 307.

Next, the saturated absolute humidity calculation unit 307 acquires the cooling water temperature Tegrc of the EGR cooler 42 from the water temperature sensor 47 (Step S1302). Then, the saturated absolute humidity calculation unit 307 calculates the saturated absolute humidity SHsegr in the EGR cooler 42 from the exhaust pressure Pexh, the cooling water temperature Tegrc, and the graph illustrated in FIG. 12 (Step S1303). In addition, the saturated absolute humidity calculation unit 307 outputs the calculated saturated absolute humidity SHsegr to the saturated moisture amount calculation unit 308B.

In addition, the EGR flow rate calculation unit 306 acquires the air amount Qair from the air flow sensor 2 and reads the target EGR rate TEGR from the internal combustion engine control device 20 (Step S1304). Next, the EGR flow rate calculation unit 306 calculates the EGR flow rate Qegr using the air amount Qair, the target EGR rate TEGR, and Expression 5 above (Step S1305). Then, the EGR flow rate calculation unit 306 outputs the calculated EGR flow rate Qegr to the second moisture amount calculation unit 302 and the saturated moisture amount calculation unit 308B.

Note that the processing from Step S1301 to Step S1303 performed by the saturated absolute humidity calculation unit 307 and the processing from Step S1304 to Step S1305 performed by the EGR flow rate calculation unit 306 may be performed simultaneously. Alternatively, after the processing from Step S1304 to Step S1305 is performed, the processing from Step S1301 to Step S1303 may be performed.

Next, the saturated moisture amount calculation unit 308B calculates the saturated moisture amount WQsegr in the EGR cooler 42 based on the saturated absolute humidity SHsegr, the EGR flow rate Qegr output from the EGR flow rate calculation unit 306, and Expression 12 (Step S1306). Then, the saturated moisture amount calculation unit 308B outputs the calculated saturated moisture amount WQsegr to the second moisture amount calculation unit 302B.

Next, the second moisture amount calculation unit 302B reads the determination result of the fuel property from the internal combustion engine control device 20. Then, the second moisture amount calculation unit 302B calculates the mass ratio RATEw of water vapor in the exhaust gas according to Expression (Step S1307). Then, the second moisture amount calculation unit 302B calculates the moisture amount in the EGR gas based on the EGR flow rate Qegr acquired from the EGR flow rate calculation unit 306, the mass ratio RATEw of water vapor in the exhaust gas calculated in Step S1307, and Expression 11 (Step S1308).

Next, the second moisture amount calculation unit 302B compares the saturated moisture amount WQsegr acquired from the saturated moisture amount calculation unit 308B with the moisture amount calculated in Step S1308, and selects a small value. Then, the second moisture amount calculation unit 302B calculates the selected moisture amount as the second moisture amount WQegr (Step S1309). As a result, the moisture amount in the EGR gas in consideration of dew condensation in the EGR cooler 42 can be calculated as the second moisture amount WQegr. The second moisture amount calculation unit 302B outputs the calculated second moisture amount WQegr to the dew condensation calculation unit 303.

According to the operation of calculating the second moisture amount WQegr of the second embodiment, the second moisture amount WQegr can be calculated more accurately than the operation of calculating the second moisture amount WQegr of the first embodiment by considering the dew condensation in the EGR cooler 42. Further, also in the operation of calculating the second moisture amount WQegr of the second embodiment, it is not necessary to provide the second humidity sensor 46, and the number of parts can be reduced.

3-3. Third Embodiment

Next, a third embodiment in the operation of calculating the second moisture amount will be described with reference to FIGS. 14 and 15.

Figure 14:
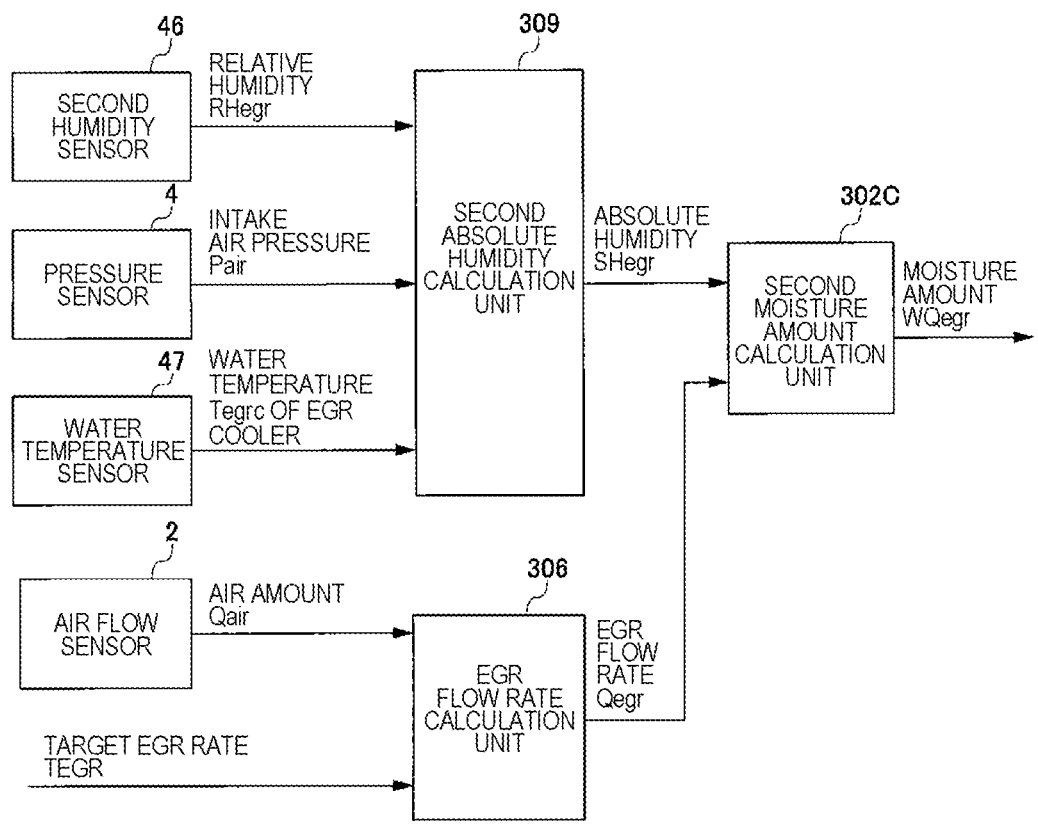
FIG. 14 is a block diagram illustrating a configuration around a second moisture amount calculation unit according to a third embodiment.

FIG. 14 is a block diagram illustrating a configuration around a second moisture amount calculation unit 302C in the third embodiment.

The calculation operation according to the third embodiment uses the humidity information of the second humidity sensor 46. In the calculation operation according to the third embodiment, the second humidity sensor 46 detects a relative humidity RHegr as the humidity information.

As illustrated in FIG. 14, the EGR flow rate calculation unit 306 and a second absolute humidity calculation unit 309 are connected to the second moisture amount calculation unit 302C. The second humidity sensor 46 outputs the relative humidity RHegr as humidity information to the second absolute humidity calculation unit 309. The intake air pressure Pair detected by the pressure sensor 4 and the cooling water temperature Tegrc of the EGR cooler 42 detected by the water temperature sensor 47 are output to the second absolute humidity calculation unit 309. Then, the second absolute humidity calculation unit 309 calculates a saturated water vapor pressure Psegr and an absolute humidity SHegr in the EGR gas passing through the second humidity sensor 46 using the relative humidity RHegr, the intake air pressure Pair, and the cooling water temperature Tegrc.

The saturated water vapor pressure Psegr is calculated from the following Expression 13.

$$P_{segr} = 6.1078 \times 10^{\frac{7.5 \times T_{egrc}}{237.3 + T_{egrc}}} \times \frac{1013}{P_{air}} \qquad [\text{Math. 13}]$$

The unit of the saturated water vapor pressure Psegr is hPa, and the unit of the cooling water temperature Tegrc is degC.

Here, when passing through the EGR cooler 42, the EGR gas is lowered to the temperature of the cooling water flowing through the EGR cooler 42. Therefore, the cooling water temperature Tegrc detected by the water temperature sensor 47 is used as the temperature of the EGR gas passing through the second humidity sensor 46. Further, as illustrated in FIG. 1, the second humidity sensor 46 is located on the intake side of the EGR valve 41. Therefore, the intake air pressure Pair detected by the pressure sensor 4 is used as the pressure of the EGR gas passing through the second humidity sensor 46.

The temperature and the pressure of the EGR gas are not limited to the above-described examples, and for example, sensors that detect the temperature and the pressure of the EGR gas, and the values detected by the sensors may be used as the temperature and the pressure of the EGR gas. However, by using the values detected by the water temperature sensor 47 and the pressure sensor 4, it is not necessary to newly provide a sensor, and the number of components can be reduced.

The absolute humidity SHegr is calculated by the following Expression 14. Here, the unit of the absolute humidity SHegr is g/m³, and the unit of the relative humidity RHegr is dimensionless.

$$SH_{egr} = 217 \times \frac{P_{sair} \times RH_{egr}}{T_{egrc} + 273.15}$$ [Math. 14]

In addition, the second absolute humidity calculation unit 309 outputs the calculated absolute humidity SHegr to the second moisture amount calculation unit 302C. The second moisture amount calculation unit 302C calculates the moisture amount in the EGR gas, that is, the second moisture amount WQegr based on the EGR flow rate Qegr calculated by the EGR flow rate calculation unit 306, the absolute humidity SHegr calculated by the second absolute humidity calculation unit 309, and the following Expression 15.

$$WQ_{egr} = \frac{Q_{egr}}{1000} \times \frac{SH_{egr}}{D_{egr}}$$ [Math. 15]

Next, an operation of calculating the second moisture amount WQegr will be described with reference to FIG. 15.

Figure 15:
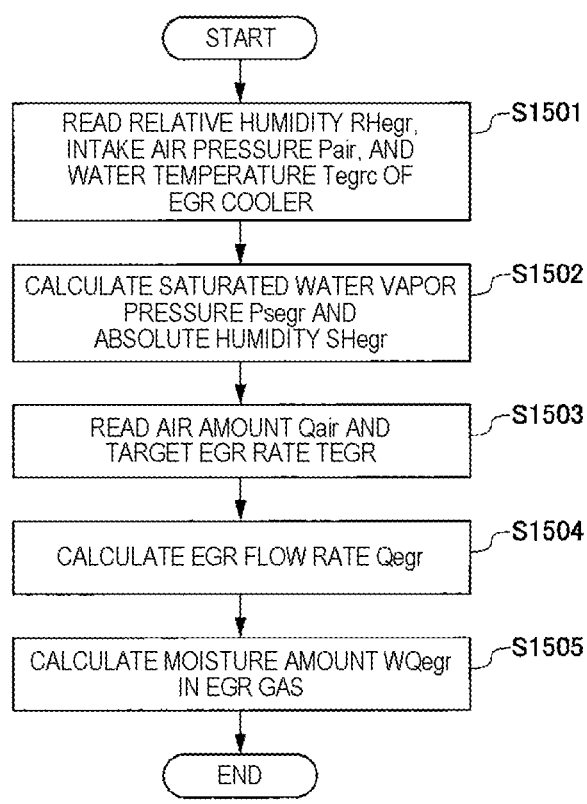
FIG. 15 is a flowchart illustrating an operation of calculating a second moisture amount according to the third embodiment.

FIG. 15 is a flowchart illustrating the operation of calculating the second moisture amount WQegr in the third embodiment.

As illustrated in FIG. 15, the second absolute humidity calculation unit 309 reads signals from the second humidity sensor 46, the pressure sensor 4, and the water temperature sensor 47 (Step S1501). That is, the first absolute humidity calculation unit 305 acquires the relative humidity RHegr detected by the second humidity sensor 46, the intake air pressure Pair detected by the pressure sensor 4, and the cooling water temperature Tegrc of the EGR cooler 42 detected by the water temperature sensor 47.

Next, the second absolute humidity calculation unit 309 calculates the saturated water vapor pressure Psegr from the acquired signal and Expression 13. Further, the second absolute humidity calculation unit 309 calculates the absolute humidity SHegr from the calculated saturated water vapor pressure Psegr, the acquired information, and Expression 14 (Step S1502). Then, the second absolute humidity calculation unit 309 outputs the calculated absolute humidity SHegr to the second moisture amount calculation unit 302C.

The EGR flow rate calculation unit 306 acquires the air amount Qair from the air flow sensor 2 and reads the target EGR rate TEGR from the internal combustion engine control device 20 (Step S1503). Next, the EGR flow rate calculation unit 306 calculates the EGR flow rate Qegr using the air amount Qair, the target EGR rate TEGR, and Expression 5 above (Step S1504). Then, the EGR flow rate calculation unit 306 outputs the calculated EGR flow rate Qegr to the second moisture amount calculation unit 302C.

Note that the processing from Step S1501 to Step S1502 performed by the second absolute humidity calculation unit 309 and the processing from Step S1503 to Step S1504 performed by the EGR flow rate calculation unit 306 may be performed simultaneously. Alternatively, after the processing from Step S1503 to Step S1504 is performed, the processing from Step S1501 to Step S1502 may be performed.

Next, the second moisture amount calculation unit 302C calculates the second moisture amount WQegr based on the EGR flow rate Qegr acquired from the EGR flow rate calculation unit 306, the absolute humidity SHegr acquired from the second absolute humidity calculation unit 309, and Expression 15 (S1505). As a result, the operation of calculating the second moisture amount WQegr is completed. The second moisture amount calculation unit 302C outputs the calculated second moisture amount WQegr to the dew condensation calculation unit 303.

According to the operation of calculating the second moisture amount WQegr of the third embodiment, the second moisture amount WQegr can be calculated more accurately by using the actual measurement value detected by the second humidity sensor 46 as the humidity information.

3-4. Fourth Embodiment

Next, a fourth embodiment in the operation of calculating the second moisture amount will be described with reference to FIGS. 16 and 17.

Figure 16:
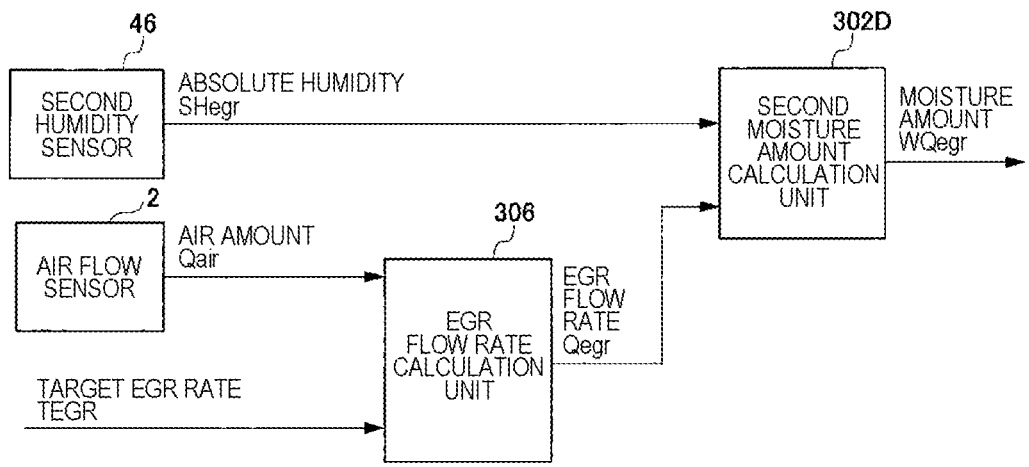
FIG. 16 is a block diagram illustrating a configuration around a second moisture amount calculation unit according to a fourth embodiment.

FIG. 16 is a block diagram illustrating a configuration around a second moisture amount calculation unit 302D in the fourth embodiment.

The calculation operation according to the fourth embodiment uses the humidity information of the second humidity sensor 46 similarly to the calculation operation according to the third embodiment. In addition, in the calculation operation according to the fourth embodiment, the second humidity sensor detects the absolute humidity SHegr as the humidity information.

As illustrated in FIG. 16, the absolute humidity SHegr detected by the second humidity sensor 46 and the EGR flow rate Qegr calculated by the EGR flow rate calculation unit 306 are output to the second moisture amount calculation unit 302D. The second moisture amount calculation unit 302D calculates the moisture amount in the EGR gas, that is, the second moisture amount WQegr, based on the EGR flow rate Qegr calculated by the EGR flow rate calculation unit 306, the absolute humidity SHegr detected by the second humidity sensor 46, and Expression 15.

Next, an operation of calculating the second moisture amount WQegr will be described with reference to FIG. 17.

Figure 17:
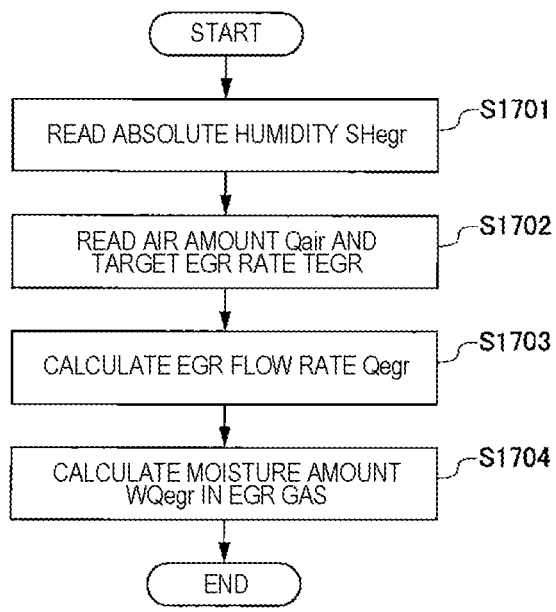
FIG. 17 is a flowchart illustrating an operation of calculating a second moisture amount according to the fourth embodiment.

FIG. 17 is a flowchart illustrating the operation of calculating the second moisture amount WQegr in the fourth embodiment.

As illustrated in FIG. 17, the second moisture amount calculation unit 302D reads the absolute humidity SHegr detected by the second humidity sensor 46 (Step S1701). Next, the EGR flow rate calculation unit 306 acquires the air amount Qair from the air flow sensor 2 and reads the target EGR rate TEGR from the internal combustion engine control device 20 (Step S1702). Next, the EGR flow rate calculation unit 306 calculates the EGR flow rate Qegr using the air amount Qair, the target EGR rate TEGR, and Expression 5 above (Step S1703). Then, the EGR flow rate calculation unit 306 outputs the calculated EGR flow rate Qegr to the second moisture amount calculation unit 302D.

Note that the processing in Step S1701 performed by the second moisture amount calculation unit 302D and the processing from Step S1702 to Step S1503 performed by the EGR flow rate calculation unit 306 may be performed simultaneously. Alternatively, the processing of Step S1701 may be performed after the processing from Step S1702 to Step S1703 is performed.

Next, the second moisture amount calculation unit 302D calculates the second moisture amount WQegr based on the EGR flow rate Qegr acquired from the EGR flow rate calculation unit 306, the absolute humidity SHegr acquired from the second humidity sensor 46, and Expression 15 (S1704). As a result, the operation of calculating the second moisture amount WQegr is completed. The second moisture amount calculation unit 302D outputs the calculated second moisture amount WQegr to the dew condensation calculation unit 303.

According to the operation of calculating the second moisture amount WQegr of the fourth embodiment, similarly to the operation of calculating the second moisture amount WQegr of the third embodiment, the second moisture amount WQegr can be calculated more accurately by using the actual measurement value detected by the second humidity sensor 46 as the humidity information.

4. Operation Example of Calculating Intercooler Saturated Moisture Amount

Next, an operation example of calculating the saturated moisture amount in the intercooler 7 will be described with reference to FIGS. 18 and 19.

Figure 18:
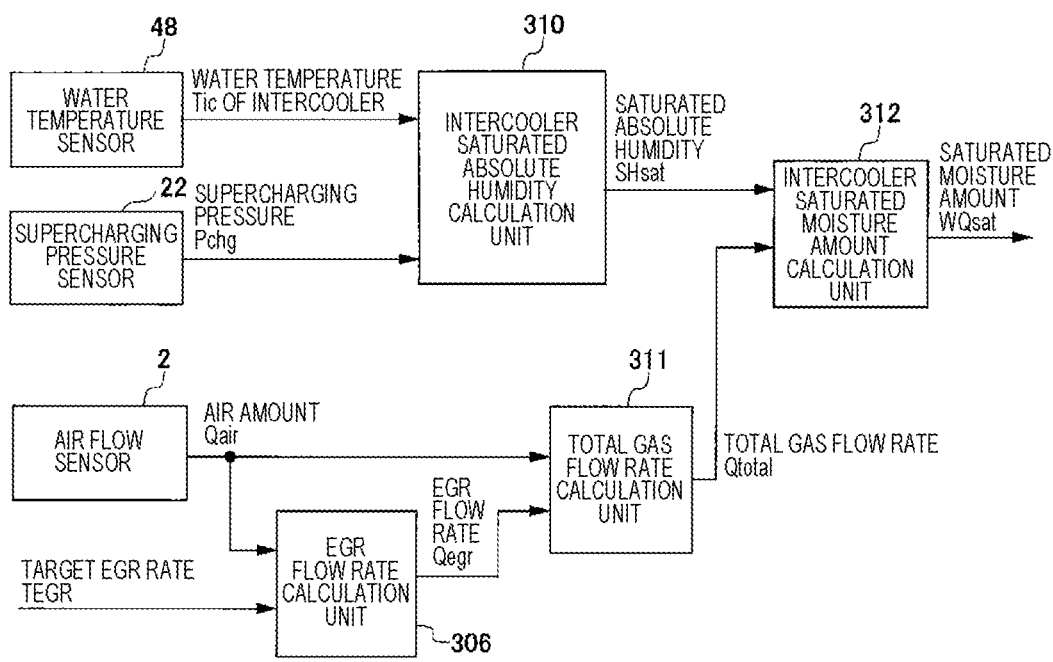
FIG. 18 is a block diagram illustrating a configuration around an intercooler saturated moisture amount calculation unit in the embodiment.

FIG. 18 is a block diagram illustrating a configuration around the intercooler saturated moisture amount calculation unit 312.

As illustrated in FIG. 18, an intercooler saturated absolute humidity calculation unit 310 and a total gas flow rate calculation unit 311 are connected to the intercooler saturated moisture amount calculation unit 312. The intercooler saturated absolute humidity calculation unit 310 outputs the saturated absolute humidity SHsat of the intercooler 7 from the intercooler saturated moisture amount calculation unit 312. Further, a total gas flow rate Qtotal is output from the total gas flow rate calculation unit 311 to the intercooler saturated moisture amount calculation unit 312.

A cooling water temperature Tic of the intercooler 7 detected by the water temperature sensor 48 and a supercharging pressure Pchg which is the pressure after supercharging detected by the supercharging pressure sensor 22 are output to the intercooler saturated absolute humidity calculation unit 310. Then, the intercooler saturated absolute humidity calculation unit 310 calculates the saturated absolute humidity SHsat when it is assumed that dew condensation occurs in the intercooler 7 from the cooling water temperature Tic and the supercharging pressure Pchg. When dew condensation occurs in the intercooler 7, as illustrated in FIG. 12, the saturated absolute humidity SHsat can be obtained from the relationship between the pressure and the temperature.

The air amount Qair detected by the air flow sensor 2 and the EGR flow rate Qegr calculated by the EGR flow rate calculation unit 306 are output to the total gas flow rate calculation unit 311. The total amount of gas passing through the intercooler 7 is the sum of the air amount Qair detected by the air flow sensor 2 and the EGR flow rate Qegr calculated by the EGR flow rate calculation unit 306. Therefore, the total gas flow rate calculation unit 311 calculates the total gas flow rate Qtotal from the air amount Qair, the EGR flow rate Qegr, and the following Expression 16.

$$Q_{total} = Q_{air} + Q_{egr} \quad \text{[Math. 16]}$$

The intercooler saturated moisture amount calculation unit 312 calculates a saturated moisture amount WQsat in the intercooler 7 from the saturated absolute humidity SHsat and the total gas flow rate Qtotal. The saturated moisture amount WQsat is calculated from the saturated absolute humidity SHsat, the total gas flow rate Qtotal, and the following Expression 17. Here, the unit of the total gas flow rate Qtotal and the saturated moisture amount WQsat is g/s. Dtotal is a density of a mixed gas of fresh air and EGR gas, and a unit thereof is $g/m^3$.

$$WQ_{sat} = \frac{Q_{total}}{1000} \times \frac{SH_{sat}}{D_{total}} \quad \text{[Math. 17]}$$

Next, an operation of calculating the intercooler saturated moisture amount WQsat will be described with reference to FIG. 19.

Figure 19:
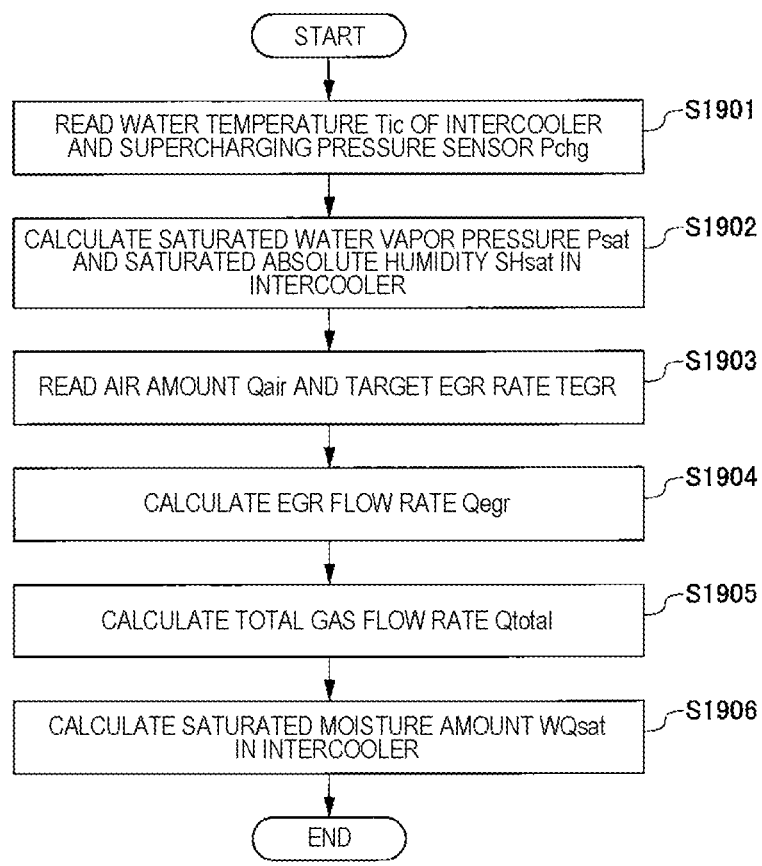
FIG. 19 is a flowchart illustrating an operation of calculating an intercooler saturated moisture amount according to the embodiment.

FIG. 19 is a flowchart illustrating an operation of calculating the intercooler saturated moisture amount WQsat.

As illustrated in FIG. 19, the intercooler saturated absolute humidity calculation unit 310 first reads the cooling water temperature Tic of the intercooler 7 detected by the water temperature sensor 48 and the supercharging pressure Pchg detected by the supercharging pressure sensor 22 (Step S1901). Next, the intercooler saturated absolute humidity calculation unit 310 calculates a saturated water vapor pressure Psat and the saturated absolute humidity SHsat in the intercooler 7 from the relationship among the cooling water temperature Tic, the supercharging pressure Pchg, and the pressure and temperature illustrated in FIG. 12 (Step S1902). Then, the intercooler saturated absolute humidity calculation unit 310 outputs the calculated saturated absolute humidity SHsat to the intercooler saturated moisture amount calculation unit WQsat.

Next, the EGR flow rate calculation unit 306 acquires the air amount Qair from the air flow sensor 2 and reads the target EGR rate TEGR from the internal combustion engine control device (Step S1903). Next, the EGR flow rate calculation unit 306 calculates the EGR flow rate Qegr using the air amount Qair, the target EGR rate TEGR, and Expression 5 above (Step S1903). Then, the EGR flow rate calculation unit 306 outputs the calculated EGR flow rate Qegr to the total gas flow rate calculation unit 311.

Next, the total gas flow rate calculation unit 311 calculates the total gas flow rate Qtotal from the air amount Qair detected by the air flow sensor 2 and the EGR flow rate Qegr calculated by the EGR flow rate calculation unit 306 (Step S1905). Then, the total gas flow rate calculation unit 311 outputs the calculated total gas flow rate Qtotal to the intercooler saturated moisture amount calculation unit 312.

Next, the intercooler saturated moisture amount calculation unit 312 calculates the saturated moisture amount WQsat in the intercooler 7 based on the saturated absolute humidity SHsat, the total gas flow rate Qtotal, the density Dtotal of the mixed gas, and Expression 17 (Step S1906). As a result, the operation of calculating the intercooler saturated moisture amount WQsat is completed. The intercooler saturated moisture amount calculation unit 312 outputs the calculated intercooler saturated moisture amount WQsat to the dew condensation calculation unit 303.

5. Operation Example of Calculating Dew Condensation Generation Amount

Next, an operation of calculating a dew condensation generation amount in the dew condensation calculation unit 303 will be described with reference to FIG. 20.

Figure 20:
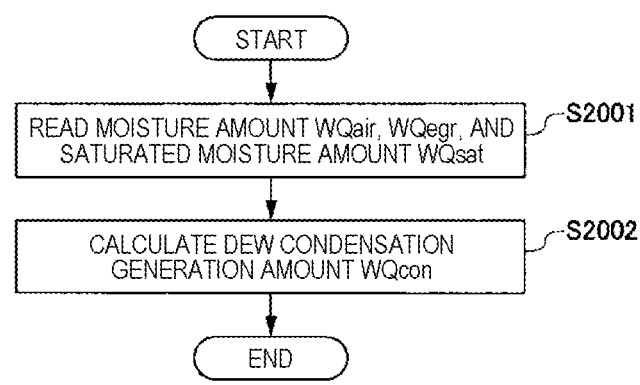
FIG. 20 is a flowchart illustrating an operation of calculating a dew condensation generation amount in a dew condensation calculation unit according to the embodiment.

FIG. 20 is a flowchart illustrating an operation of calculating a dew condensation generation amount.

As illustrated in FIG. 20, the dew condensation calculation unit 303 reads the first moisture amount WQair calculated by the first moisture amount calculation unit 301 and the second moisture amount WQegr calculated by the second moisture amount calculation unit 302. The dew condensation calculation unit 303 then reads the saturated moisture amount WQsat in the intercooler 7 calculated by the intercooler saturated moisture amount calculation unit 312 (Step S2001).

Next, the dew condensation calculation unit 303 calculates a dew condensation generation amount WQcon from the first moisture amount WQair, the second moisture amount WQegr, the saturated moisture amount WQsat, and the following Expression (Step S2002).

$$WQ_{con}(WQ_{air}+WQ_{egr})-WQ_{sat} \quad [\text{Math. 18}]$$

Here, the unit of WQcon is g/s.

The sum (WQair+WQegr) of the first moisture amount WQair and the second moisture amount WQegr in Expression 18 is the total moisture amount in the mixed gas before passing through the intercooler 7. Then, the dew condensation generation amount WQcon can be calculated by obtaining a difference of the saturated moisture amount WQsat in the intercooler 7 from the total moisture amount in the mixed gas. Then, the dew condensation calculation unit 303 outputs the calculated dew condensation generation amount WQcon to the EGR correction unit 304.

6. EGR Correction Unit

6-1. Configuration Example of EGR Correction Unit

Next, a configuration example of the EGR correction unit 304 will be described with reference to FIG. 21.

Figure 21:
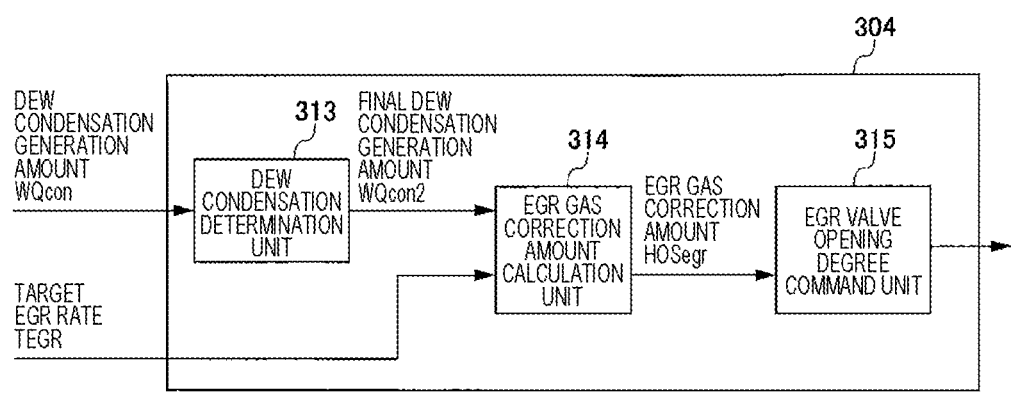
FIG. 21 is a block diagram illustrating a configuration of an EGR correction unit according to the embodiment.

FIG. 21 is a block diagram illustrating the EGR correction unit 304.

As illustrated in FIG. 21, the EGR correction unit 304 includes a dew condensation determination unit 313, an EGR gas correction amount calculation unit 314, and an EGR valve opening degree command unit 315. The dew condensation generation amount WQcon calculated by the dew condensation calculation unit 303 is output to the dew condensation determination unit 313. Then, the dew condensation determination unit 313 calculates a final dew condensation generation amount WQcon2 on the basis of the dew condensation generation amount WQcon.

Here, when dew condensation occurs in the intercooler 7, moisture exceeding the saturated moisture amount WQsat is condensed. Therefore, the dew condensation generation amount WQcon calculated by Expression 18 is a positive value. On the other hand, when dew condensation does not occur in the intercooler 7, the total moisture amount in the mixed gas before passing through the intercooler 7 is smaller than the saturated moisture amount WQsat. Therefore, the dew condensation generation amount WQcon calculated by Expression 18 is a negative value.

Since each sensor has a detection error, it cannot be determined that dew condensation occurs on the intercooler 7 even if the dew condensation generation amount WQcon calculated by the dew condensation calculation unit 303 is a positive value. Therefore, in the dew condensation determination unit 313 of the present example, the dew condensation determination is performed in consideration of the detection error assumed from the sensor specifications of the first humidity sensor 1, the air flow sensor 2, and the like in advance. Then, in the dew condensation determination unit 313, a threshold SL is set in advance from the detection error assumed from the sensor specification of each sensor.

When determining that the relationship between the dew condensation generation amount WQcon and the threshold SL satisfies Expression 19 below, the dew condensation determination unit 313 determines that dew condensation has occurred in the intercooler 7. At this time, the dew condensation determination unit 313 obtains the final dew condensation generation amount WQcon2 from the following Expression 20. As represented in Expression 20, the final dew condensation generation amount WQcon2 is the dew condensation generation amount WQcon calculated by the dew condensation calculation unit 303.

$$Q_{con} \geq SL \quad [\text{Math. 19}]$$

$$WQ_{con2}=WQ_{con} \quad [\text{Math. 20}]$$

On the other hand, when the dew condensation determination unit 313 determines that the relationship between the dew condensation generation amount WQcon and the threshold SL does not satisfy Expression 19, the dew condensation determination unit 313 determines that no dew condensation has occurred in the intercooler 7. Therefore, the dew condensation determination unit 313 calculates the final dew condensation generation amount WQcon2 as "0" as represented in Expression 21.

$$WQ_{con2}=0 \quad [\text{Math. 21}]$$

Then, the dew condensation determination unit 313 outputs the calculated final dew condensation generation amount WQcon2 to the EGR gas correction amount calculation unit 314.

The EGR gas correction amount calculation unit 314 calculates an EGR gas correction amount HOSegr from the final dew condensation generation amount WQcon2 and the target EGR rate TEGR. A method of calculating the EGR gas correction amount HOSegr will be described later. Then, the EGR gas correction amount calculation unit 314 outputs the calculated EGR gas correction amount HOSegr to the EGR valve opening degree command unit 315.

The EGR valve opening degree command unit 315 corrects the target EGR rate TEGR based on the EGR gas correction amount HOSegr and calculates a corrected EGR rate HEGR. The corrected EGR rate HEGR is calculated from the following Expression 22. Here, the units of the corrected EGR rate HEGR, the target EGR rate TEGR, and the EGR gas correction amount HOSegr are all dimensionless.

$$HEGR=TEGR+HOS_{egr} \quad [\text{Math. 22}]$$

In addition, the EGR valve opening degree command unit 315 transmits an opening degree command signal to the EGR valve 41 so that the EGR rate (EGR amount) becomes the calculated corrected EGR rate HEGR.

6-2. Operation Example of EGR Correction Unit 304

Next, an operation example of the EGR correction unit 304 will be described with reference to FIG. 22.

Figure 22:
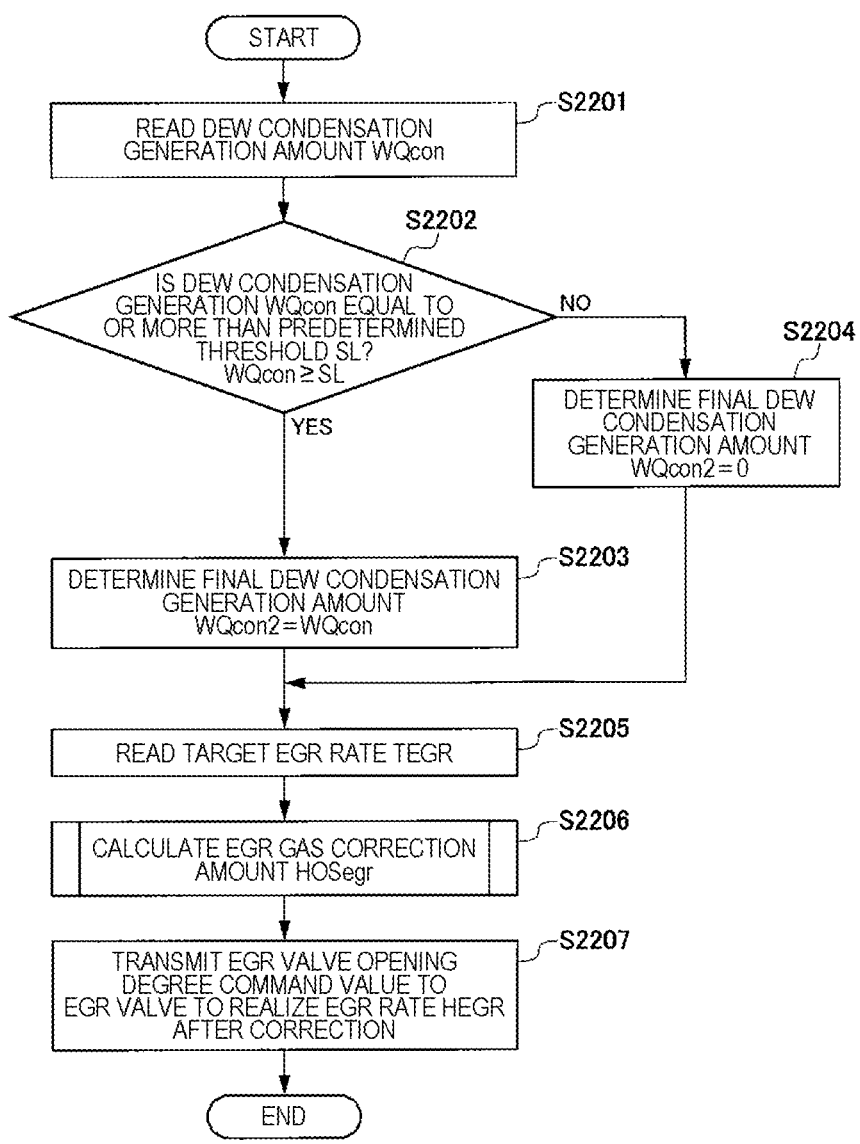
FIG. 22 is a flowchart illustrating an operation example of the EGR correction unit according to the embodiment.

FIG. 22 is a flowchart illustrating an operation example of the EGR correction unit 304.

As illustrated in FIG. 22, first, the dew condensation determination unit 313 of the EGR correction unit 304 reads the dew condensation generation amount WQcon calculated by the dew condensation calculation unit 303 (Step S2201). Next, the dew condensation determination unit 313 determines whether the dew condensation generation amount WQcon is equal to or larger than a predetermined threshold SL (Step S2202).

In Step S2202, when the dew condensation determination unit 313 determines that the dew condensation generation amount WQcon is equal to or larger than the threshold SL (YES in S2202), the dew condensation determination unit determines that the final dew condensation generation amount WQcon2 is the dew condensation generation amount WQcon (Step S2203).

In Step S2202, when the dew condensation determination unit 313 determines that the dew condensation generation amount WQcon has not reached the threshold SL (NO determination in S2202), the dew condensation determination unit 313 determines the final dew condensation generation amount WQcon2 as "0" (Step S2204).

Upon completion of the processing in Step S2203 or Step S2204, the dew condensation determination unit 313 outputs the determined final dew condensation generation amount WQcon2 to the EGR gas correction amount calculation unit 314. Next, the EGR gas correction amount calculation unit 314 reads a target EGR rate TEGR which is an EGR rate before correction (Step S2205). Then, the EGR gas correction amount calculation unit 314 calculates the EGR gas correction amount HOSegr from the final dew condensation generation amount WQcon2 and the target EGR rate TEGR (Step S2206). Further, a method of calculating the EGR gas correction amount HOSegr will be described later.

Next, the EGR gas correction amount calculation unit 314 outputs the calculated EGR gas correction amount HOSegr to the EGR valve opening degree command unit 315. Then, the EGR valve opening degree command unit 315 calculates a corrected EGR rate HEGR based on the EGR gas correction amount HOSegr, the target EGR rate TEGR, and Expression 22. Next, the EGR valve opening degree command unit 315 calculates an EGR valve opening degree command value for realizing the calculated corrected EGR rate HEGR, and transmits the EGR valve opening degree command value to the EGR valve 41 (Step S2207). As a result, the correction operation of the EGR rate and the flow rate of the EGR gas by the EGR correction unit 304 is completed.

6-3. Operation Example of Calculating EGR Gas Correction Amount

Next, an operation of calculating the EGR gas correction amount in the EGR gas correction amount calculation unit 314 will be described with reference to FIGS. 23 to 29.

Figures 23, 24:
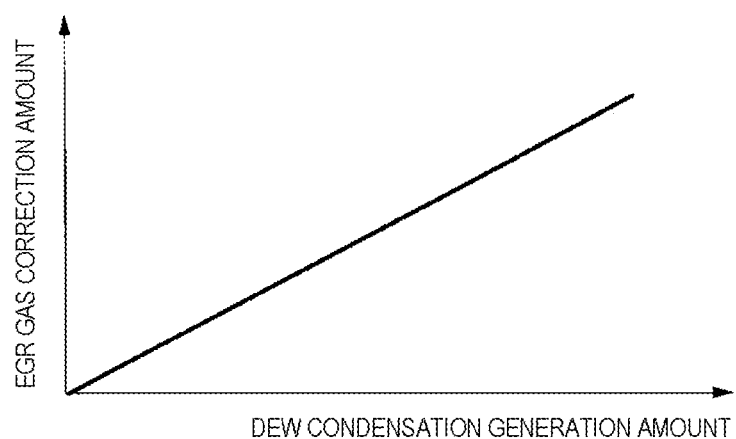
FIG. 23 is a graph illustrating a relationship between an EGR gas correction amount and a dew condensation generation amount.
FIG. 24 is a diagram illustrating an EGR gas correction table stored in an EGR gas correction calculation unit according to the embodiment.

FIG. 23 is a graph illustrating a relationship between the EGR gas correction amount and the dew condensation generation amount.

When dew condensation occurs in the intercooler 7, water vapor of a mixed gas component of fresh air and EGR gas decreases. That is, the larger the final dew condensation generation amount WQcon2, the larger the decrease amount of water vapor. Therefore, as illustrated in FIG. 23, the EGR gas correction amount HOSegr is made larger as the final dew condensation generation amount WQcon2 is larger.

FIG. 24 is a diagram illustrating an EGR gas correction table stored in the EGR gas correction amount calculation unit 314.

As illustrated in FIG. 24, when dew condensation does not occur in the intercooler 7, that is, when the value of the final dew condensation generation amount WQcon2 is "0", the value of the EGR gas correction amount HOSegr is set to "0". Then, as the final dew condensation generation amount WQcon2 increases, the value of the table illustrated in FIG. 24 is set such that the value of the EGR gas correction amount HOSegr also increases.

The EGR gas correction amount HOSegr with respect to the final dew condensation generation amount WQcon2 may be calculated using a combustion speed to be described later, or may be obtained by an experiment. When the EGR gas correction amount HOSegr is obtained by an experiment, first, a first ignition timing ADV1 that is the ignition timing when the target EGR rate is set is stored under the condition that dew condensation does not occur in the intercooler 7. Next, a condition that dew condensation occurs in the intercooler 7 is realized while the target EGR rate is maintained by a method such as intentionally lowering the temperature of the cooling water flowing through the intercooler 7, and the final dew condensation generation amount WQcon2 in this state is stored.

As described above, when dew condensation occurs, the flow rate of the EGR gas decreases, so that knocking is likely to occur. Therefore, as the ignition timing, a second ignition timing ADV2 on the retard side of the first ignition timing ADV1, which is the ignition timing before the occurrence of dew condensation, is the optimum ignition timing. The EGR rate is increased until the optimum ignition timing in the dew condensation generation state reaches the first ignition timing ADV1 from the second ignition timing ADV2. The EGR rate when the optimum ignition timing reaches the first ignition timing ADV1 is defined as a corrected EGR rate. As a result, the relationship of the EGR gas correction amount HOSegr with respect to the final dew condensation generation amount WQcon2 can be obtained from the final dew condensation generation amount WQcon2 and the difference between the corrected EGR rate and the target EGR rate, and the value of the table illustrated in FIG. 24 can be set by an experiment.

Next, a method of calculating the EGR correction amount HOSegr from a combustion speed VL will be described with reference to FIGS. 25 to 28.

FIGS. 25 to 28 are graphs illustrating a relationship between the combustion speed VL and the target EGR rate TEGR.

Here, the flame is an oxidation reaction of the unmixed gas, and burning spread toward the unmixed gas in front. This burning spreading speed is the combustion speed. The combustion speed is roughly divided into a laminar flow combustion speed, which is a speed at which flame spreads, and a turbulent flow combustion speed, which is a speed at which flame accelerates due to turbulence. The combustion speed described in the present example indicates a laminar flow combustion speed. The combustion speed decreases as the mixed gas contains more components that inhibit combustion. In addition, since the EGR gas is an exhaust gas after combustion, the EGR gas is composed of components that inhibit combustion such as carbon dioxide and water vapor.

Figure 25:
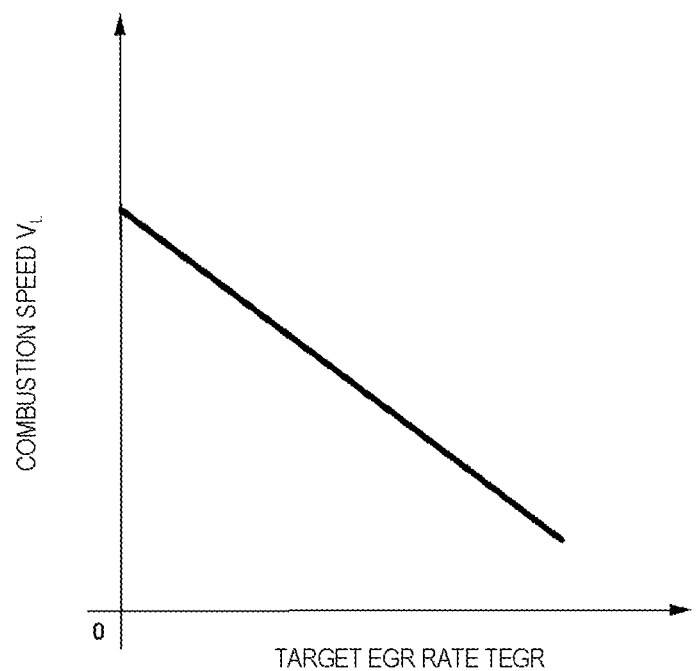
FIG. 25 is a diagram illustrating a relationship between a combustion speed and a target EGR rate.

Therefore, as illustrated in FIG. 25, as the EGR rate increases, the effect of inhibiting combustion increases, and the combustion speed VL decreases. That is, the EGR rate and the combustion speed VL have a negative correlation.

Figure 26:
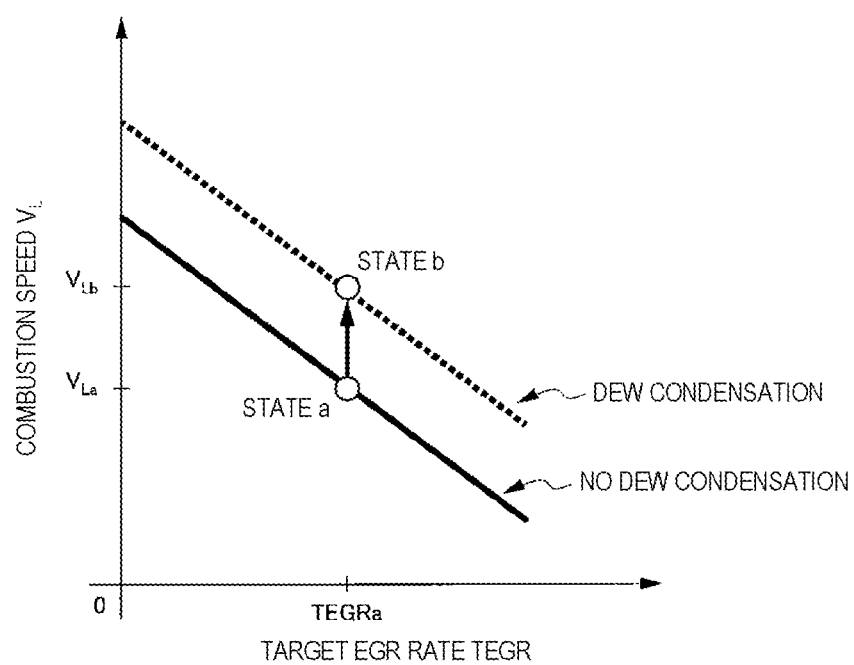
FIG. 26 illustrates a relationship between a combustion speed and a target EGR rate, and is a diagram illustrating a change in the combustion speed when dew condensation occurs.

FIG. 26 is a diagram illustrating the relationship between the target EGR rate TEGR and the combustion speed VL with the presence or absence of dew condensation in the intercooler 7. A solid line illustrated in FIG. 26 indicates a state in which dew condensation does not occur in the intercooler 7, and a broken line indicates a state in which dew condensation occurs in the intercooler 7. In addition, the target EGR rate in the first state a when dew condensation does not occur is set as a first EGR rate TEGRa, and the combustion speed is set as a first combustion speed VLa.

As illustrated in FIG. 26, when dew condensation occurs in the first state a, water vapor that inhibits combustion decreases, so that the combustion speed VL increases. Therefore, the first state a changes to a second state b indicated by a broken line in which dew condensation has occurred, and the combustion speed VL changes to a second combustion speed VLb higher than the first combustion speed VLa.

Figure 27:
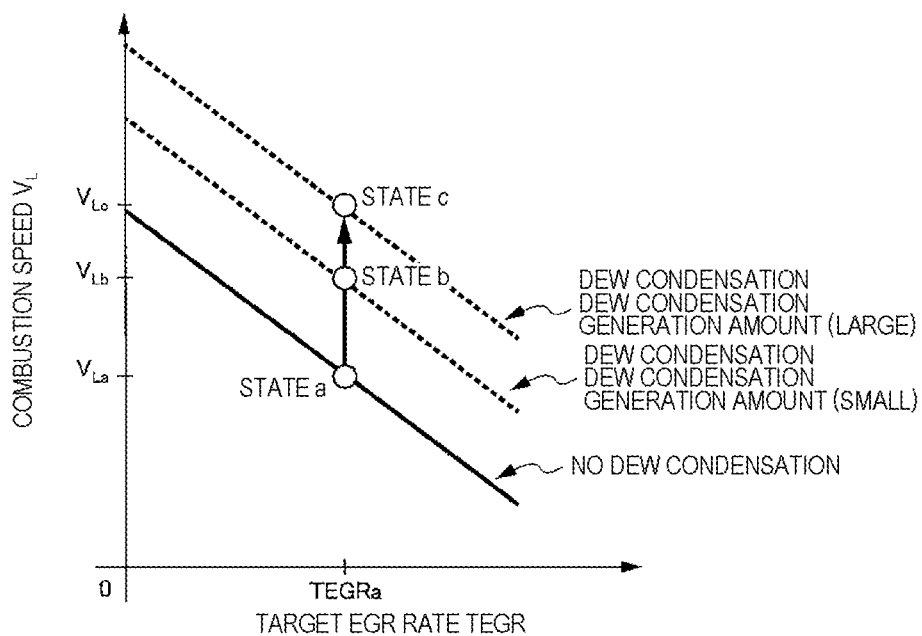
FIG. 27 illustrates a relationship between a combustion speed and a target EGR rate, and is a diagram illustrating a change in the combustion speed when dew condensation occurs.

FIG. 27 is a diagram in which a third state c in which the amount of dew condensation generated is larger than that in the second state b is added.

As illustrated in FIG. 27, in the third state c, the dew condensation generation amount increases and the water vapor further decreases as compared with the second state b, and thus, the combustion speed VL changes to the third combustion speed VLc faster than the second combustion speed VLb.

As illustrated in FIGS. 26 and 27, when the dew condensation generation amount increases, the combustion speed VL increases, so that the possibility of occurrence of abnormal combustion such as knocking increases. As a result, the ignition timing is controlled to the retard side, and a desired ignition timing cannot be realized, which causes deterioration of fuel consumption and torque reduction. In order to prevent deterioration of fuel consumption and a decrease in torque, it is necessary to realize combustion at a desired ignition timing.

Figure 28:
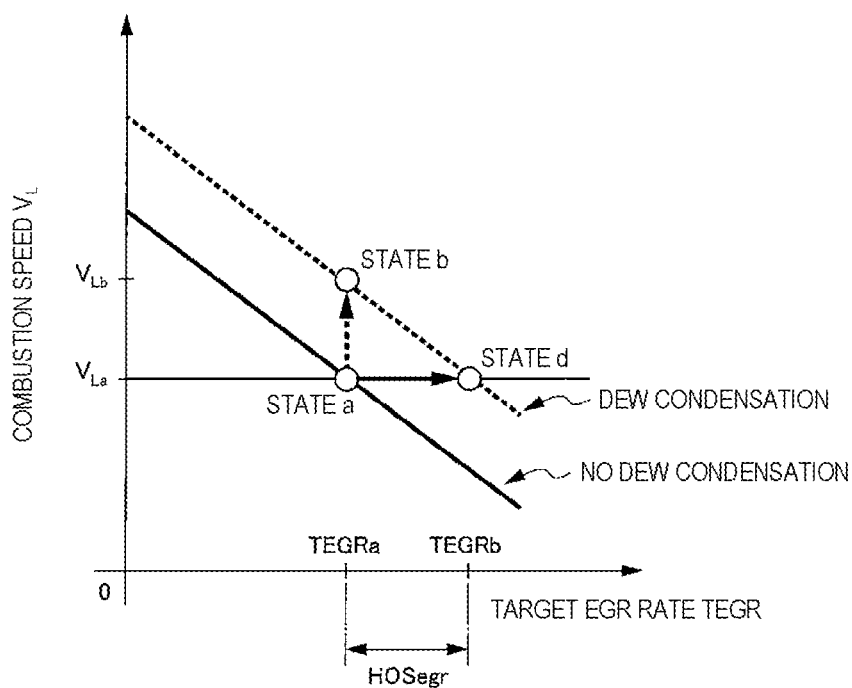
FIG. 28 illustrates a relationship between a combustion speed and a target EGR rate, and is a diagram illustrating a concept of an EGR correction amount when dew condensation occurs.

FIG. 28 is a diagram illustrating a calculation state of the EGR gas correction amount when the state is shifted from the first state a to the second state b due to generation of dew condensation at the target EGR rate of the first EGR rate TEGRa.

As illustrated in FIG. 28, when the state is displaced from the first state a to the second state b, the combustion speed VL increases from the first combustion speed VLa to the second combustion speed VLb. When the EGR rate is not corrected, the ignition timing is controlled to be retarded by the increased combustion speed VL.

On the other hand, in order to realize a desired ignition timing, the EGR rate is increased until the second combustion speed VLb in the second state b becomes equal to the first combustion speed VLa in the first state a, that is, until the second state b becomes a fourth state d. The EGR rate in the fourth state d is referred to as a second EGR rate TEGRb. The EGR gas correction amount HOSegr calculated by the EGR gas correction amount calculation unit 314 is a difference value between the second EGR rate TEGRb and the first EGR rate TEGRa (HOSegr=TEGRb−TEGRa).

Next, a method of calculating the actual combustion speed will be described.

The equation for determining the combustion speed is calculated by the following Expression 23 and Expression 24 using the generally known Metghalchi & Keck equation. Although the case where gasoline is applied as the fuel is described here, the coefficient is changed in the case of other fuels. VL represents a desired combustion speed, φ represents an equivalent ratio, T represents an in-cylinder temperature at the ignition timing, P represents an in-cylinder pressure at the ignition timing, Y represents an EGR rate, and Vcon represents a combustion speed that increases when dew condensation occurs.

In addition, the units of VL, VL,ref, Vcon, and e(φ) are m/s, the unit of T is K, the unit of P is hPa, and the unit of EGR rate is dimensionless. Further, the in-cylinder temperature T and the in-cylinder pressure P at the ignition timing are geometrically obtained from the specifications of the internal combustion engine 100. The combustion speed Vcon that increases when dew condensation occurs is a difference between the second combustion speed VLb and the first combustion speed VLa, for example, in FIG. 28, and has a proportional relationship with the final dew condensation generation amount WQcon2.

$$V_L = V_{L,ref} - e(\varphi) + V_{con} \quad [\text{Math. 23}]$$

$$V_{L,ref} = 0.305 \times \left(\frac{T}{298}\right)^{1.87} \times \left(\frac{P}{1013}\right)^{-0.12} \times (1 - 2.06 \times Y^{0.77}) \quad [\text{Math. 24}]$$

$$e(\varphi) = 0.549 \times (\varphi - 1.21)$$

Figure 29:
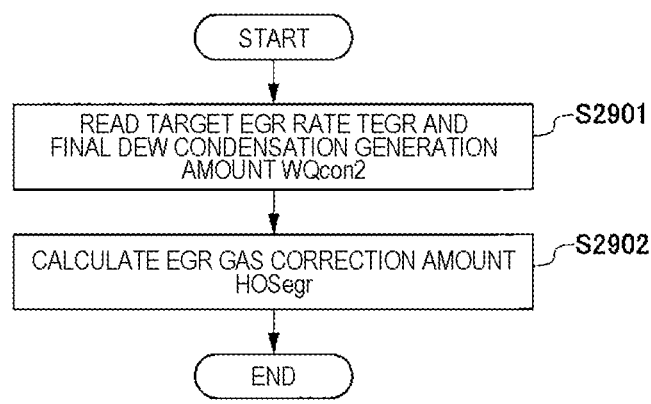
FIG. 29 is a flowchart illustrating an operation of calculating the EGR gas correction amount in an EGR gas correction amount calculation unit according to the embodiment.

FIG. 29 is a flowchart illustrating an operation of calculating the EGR gas correction amount in the EGR gas correction amount calculation unit 314. The processing illustrated in FIG. 29 is processing of calculating the EGR gas correction amount HOSegr of Step S2206 illustrated in FIG. 22.

As illustrated in FIG. 29, the EGR gas correction amount calculation unit 314 reads the target EGR rate TEGR and the final dew condensation generation amount WQcon2 (Step S2901). Next, the EGR gas correction amount calculation unit 314 calculates an EGR gas correction amount HOSegr (Step S2902). In the processing of step S2902, for example, when the EGR gas correction amount HOSegr is obtained from the EGR gas correction table, the table illustrated in FIG. 24 is used. Then, the EGR gas correction amount calculation unit 314 searches the table illustrated in FIG. 24 for the value of the EGR gas correction amount HOSegr from the final dew condensation generation amount WQcon2 to obtain the EGR gas correction amount HOSegr.

When the EGR gas correction amount HOSegr is obtained using the combustion speed, the EGR gas correction amount calculation unit 314 obtains the EGR gas correction amount HOSegr according to Expression 23 and Expression 24. The in-cylinder temperature T and the in-cylinder pressure P at the ignition timing are geometrically obtained from the specifications of the internal combustion engine 100. The equivalent ratio φ acquires information from the internal combustion engine control device 20.

As a result, the corrected EGR rate HEGR can be calculated from the EGR gas correction amount HOSegr obtained from the EGR gas correction table and the combustion speed and Expression 22. Then, the EGR valve opening degree command unit 315 calculates an EGR valve opening degree command value for realizing the calculated corrected EGR rate HEGR, and transmits the EGR valve opening degree command value to the EGR valve 41. As a result, it is possible to appropriately correct the flow rate of the EGR gas recirculated to the intake air, and it is possible to perform ignition at a desired ignition timing without controlling the ignition timing to the retard side even when dew condensation occurs. As a result, good combustion can be realized without causing deterioration in fuel consumption and reduction in torque.

7. Example of Time Chart of EGR Gas Correction

Next, an example of a time chart when the above-described correction operation of the EGR gas is performed will be described with reference to FIG. 30.

FIG. 30 is a time chart illustrating an example when the correction operation of the EGR gas is performed.

As illustrated in FIG. 30, at time t=t0 when the internal combustion engine 100 is stopped, the temperature Tic of the cooling water in the intercooler 7 is low, and dew condensation occurs. When the internal combustion engine 100 operates, the temperature Tic of the cooling water in the intercooler 7 increases with the lapse of time. At time t=t1, the saturated moisture amount WQsat of the intercooler 7 is larger than the sum of the first moisture amount WQair, which is the moisture amount in the fresh air, and the second moisture amount WQegr, which is the moisture amount in the EGR gas. After the time t1, dew condensation does not occur in the intercooler 7.

Since dew condensation occurs in the intercooler 7 from the time t0 to the time t1, the EGR gas correction amount HOSegr is added to the target EGR rate TEGR. When the temperature Tic of the cooling water increases, the saturated moisture amount WQsat increases, so that the final dew condensation generation amount WQcon2 decreases. Therefore, the EGR gas correction amount HOSegr also decreases. After the time t=t1, the values of the final dew condensation generation amount WQcon2 and the EGR gas correction amount HOSegr become "0".

The invention is not limited to the embodiments described above and illustrated in the drawings, and various modifications can be made without departing from the gist of the invention described in the claims.

In the embodiment described above, an example has been described in which the first moisture amount WQair is calculated as the moisture amount in the fresh air, and the second moisture amount WQegr is calculated as the moisture amount of the EGR gas, and the total moisture amount in the mixed gas is calculated, but the present invention is not limited thereto. For example, a sensor for detecting humidity information in the mixed gas in which the fresh air and the EGR gas are mixed may be provided on the upstream side of the intercooler 7, and the moisture amount contained in the mixed gas immediately before flowing into the intercooler 7 may be calculated from the humidity information detected by the sensor. As a result, the operation of calculating the moisture amount can be simplified.

REFERENCE SIGNS LIST 1 first humidity sensor
2 air flow sensor
3 electronically controlled throttle valve
4 pressure sensor
5a compressor
5b turbine
6 variable valve
7 intercooler
9 air-fuel ratio sensor
10 three-way catalyst
11 electronically controlled wastegate valve
12 accelerator opening degree sensor
13 injector
14 cylinder
15 exhaust pipe
16 ignition plug
17 intake air temperature sensor
18 recirculation valve
19 brake switch
20 internal combustion engine control device
22 supercharging pressure sensor
25 intake valve
26 piston
40 EGR flow path pipe
41 EGR valve
42 EGR cooler
43 differential pressure sensor
44 EGR temperature sensor
46 second humidity sensor
47, 48 water temperature sensor
100 internal combustion engine
121 microcomputer (control unit)
301, 301B first moisture amount calculation unit
302, 302B, 302C, 302D second moisture amount calculation unit
303 dew condensation calculation unit
304 EGR correction unit
305 first absolute humidity calculation unit
306 EGR flow rate calculation unit
307 saturated absolute humidity calculation unit
308B saturated moisture amount calculation unit
309 second absolute humidity calculation unit
310 intercooler saturated absolute humidity calculation unit
311 total gas flow rate calculation unit
312 intercooler saturated moisture amount calculation unit
313 dew condensation determination unit
314 EGR gas correction amount calculation unit
315 EGR valve opening degree command unit
WQair first moisture amount
WQegr second moisture amount
WQsat saturated moisture amount
WQcon2 final dew condensation generation amount
HOSegr EGE gas correction amount

The invention claimed is:

1. An internal combustion engine control device that controls an internal combustion engine including an intercooler that cools intake air and an EGR flow path pipe that recirculates a part of exhaust gas in an exhaust path to an upstream side of the intercooler as EGR gas, the internal combustion engine control device comprising:
a moisture amount calculation unit configured to calculate a total moisture amount contained in a mixed gas obtained by mixing fresh air flowing into the intercooler and the EGR gas;
a dew condensation calculation unit configured to calculate a dew condensation generation amount in the intercooler based on the total moisture amount calculated by the moisture amount calculation unit; and
an EGR correction unit configured to correct a flow rate of the EGR gas to be recirculated based on the dew condensation generation amount calculated by the dew condensation calculation unit, wherein the EGR correction unit includes an EGR gas correction table in which an EGR gas correction amount for correcting the EGR gas according to the dew condensation generation amount is set.

2. The internal combustion engine control device according to claim 1, comprising:
a first moisture amount calculation unit configured to calculate a first moisture amount that is a moisture amount contained in the fresh air; and
a second moisture amount calculation unit configured to calculate a second moisture amount that is a moisture amount contained in the EGR gas,
wherein the total moisture amount is a sum of the first moisture amount and the second moisture amount.

3. The internal combustion engine control device according to claim 2, wherein the first moisture amount calculation unit calculates the first moisture content based on humidity information from a first humidity sensor that is disposed on an upstream side of a junction with the EGR flow path pipe and detects humidity of the fresh air.

4. The internal combustion engine control device according to claim 2, wherein the second moisture amount calculation unit calculates the second moisture amount based on a fuel property, a target EGR rate of the EGR gas before being corrected by the EGR correction unit, and an amount of intake air.

5. The internal combustion engine control device according to claim 4, comprising:
a saturated moisture amount calculation unit configured to calculate a saturated moisture amount of an EGR cooler that cools the EGR gas before being recirculated,
wherein the second moisture amount calculation unit calculates the second moisture amount based on the saturated moisture amount of the EGR cooler calculated by the saturated moisture amount calculation unit, the fuel property, the target EGR rate, and the amount of intake air.

6. The internal combustion engine control device according to claim 1, wherein the EGR correction unit corrects a flow rate of the EGR gas such that a combustion speed when dew condensation occurs in the intercooler is a same as a combustion speed when no dew condensation occurs.

7. The internal combustion engine control device according to claim 1, comprising:
an intercooler saturated moisture amount calculation unit configured to calculate a saturated moisture amount of the intercooler,
wherein the dew condensation calculation unit calculates the dew condensation generation amount based on the total moisture amount and the saturated moisture amount of the intercooler calculated by the intercooler saturated moisture amount calculation unit.

8. The internal combustion engine control device according to claim 7, wherein the EGR correction unit corrects a flow rate of the EGR gas based on a target EGR rate of the EGR gas before being corrected and a dew condensation generation amount calculated by the dew condensation calculation unit.

9. The internal combustion engine control device according to claim 8, wherein the EGR correction unit calculates an EGR valve opening degree command value based on the target EGR rate and an EGR gas correction amount for correcting the EGR gas, and outputs a calculated EGR valve opening degree command value to an EGR valve that controls a flow rate of the EGR gas.

10. The internal combustion engine control device according to claim 1, comprising:
a dew condensation determination unit configured to calculate a final dew condensation generation amount based on the dew condensation generation amount calculated by the dew condensation calculation unit and a preset threshold,
wherein the EGR correction unit corrects a flow rate of the EGR gas based on the final dew condensation generation amount calculated by the dew condensation determination unit.

11. An internal combustion engine control device that controls an internal combustion engine including an intercooler that cools intake air and an EGR flow path pipe that recirculates a part of exhaust gas in an exhaust path to an upstream side of the intercooler as EGR gas,
the internal combustion engine control device comprising:
a moisture amount calculation unit configured to calculate a total moisture amount contained in a mixed gas obtained by mixing fresh air flowing into the intercooler and the EGR gas;
a dew condensation calculation unit configured to calculate a dew condensation generation amount in the intercooler based on the total moisture amount calculated by the moisture amount calculation unit;
an EGR correction unit configured to correct a flow rate of the EGR gas to be recirculated based on the dew condensation generation amount calculated by the dew condensation calculation unit;
a first moisture amount calculation unit configured to calculate a first moisture amount that is a moisture amount contained in the fresh air; and
a second moisture amount calculation unit configured to calculate a second moisture amount that is a moisture amount contained in the EGR gas,
wherein the total moisture amount is a sum of the first moisture amount and the second moisture amount and,
wherein the second moisture amount calculation unit calculates the second moisture amount based on humidity information from a second humidity sensor that detects humidity of the EGR gas flowing through the EGR flow path pipe.

12. An internal combustion engine control device that controls an internal combustion engine including an intercooler that cools intake air and an EGR flow path pipe that recirculates a part of exhaust gas in an exhaust path to an upstream side of the intercooler as EGR gas,
the internal combustion engine control device comprising:
a moisture amount calculation unit configured to calculate a total moisture amount contained in a mixed gas obtained by mixing fresh air flowing into the intercooler and the EGR gas;
a dew condensation calculation unit configured to calculate a dew condensation generation amount in the intercooler based on the total moisture amount calculated by the moisture amount calculation unit; and
an EGR correction unit configured to correct a flow rate of the EGR gas to be recirculated based on the dew condensation generation amount calculated by the dew condensation calculation unit,
wherein the EGR correction unit corrects a flow rate of the EGR gas such that a combustion speed when dew condensation occurs in the intercooler is a same as a combustion speed when no dew condensation occurs, and wherein the EGR correction unit calculates the combustion speed based on an in-cylinder pressure of a cylinder constituting the internal combustion engine, an in-cylinder temperature of the cylinder, an equivalent ratio, and an EGR rate.

* * * * *